US012670659B2

(12) United States Patent
Chu et al.

(10) Patent No.: US 12,670,659 B2
(45) Date of Patent: Jun. 30, 2026

(54) GENERATIVE MODELING OF THREE DIMENSIONAL SCENES AND APPLICATIONS TO INVERSE PROBLEMS

(71) Applicant: Google LLC, Mountain View, CA (US)

(72) Inventors: Wen-Sheng Chu, Santa Clara, CA (US); Dmitry Lagun, San Jose, CA (US); Ioannis Daras, Austin, TX (US); Abhishek Kumar, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 124 days.

(21) Appl. No.: 18/714,862

(22) PCT Filed: Jan. 13, 2022

(86) PCT No.: PCT/US2022/012252
§ 371 (c)(1),
(2) Date: May 30, 2024

(87) PCT Pub. No.: WO2023/129190
PCT Pub. Date: Jul. 6, 2023

(65) Prior Publication Data
US 2025/0037353 A1     Jan. 30, 2025

(30) Foreign Application Priority Data
Dec. 30, 2021     (GR) .............................. 20210100924

(51) Int. Cl.
*G06T 15/20*          (2011.01)
*G06N 3/08*          (2023.01)

(52) U.S. Cl.
CPC .............. *G06T 15/20* (2013.01); *G06N 3/08* (2013.01)

(58) Field of Classification Search
CPC ........... G06T 17/00; G06T 15/20; G06N 3/08
See application file for complete search history.

(56) References Cited

U.S. PATENT DOCUMENTS

2022/0189104 A1*  6/2022  Wetzstein ................ G06N 3/09
2022/0239844 A1*  7/2022  Lv .......................... G06T 15/205
2022/0284658 A1*  9/2022  Müller ................... G06N 3/084
(Continued)

FOREIGN PATENT DOCUMENTS

WO     WO2020226630 A1     11/2020

OTHER PUBLICATIONS

Chan, Eric R., et al. ("pi-gan: Periodic implicit generative adversarial networks for 3d-aware image synthesis." Proceedings of the IEEE/CVF conference on computer vision and pattern recognition. 2021.) (Year: 2021).*
(Continued)

*Primary Examiner* — Yu Chen
(74) *Attorney, Agent, or Firm* — DORITY & MANNING P.A.

(57) ABSTRACT

Systems and methods for training a generative neural radiance field model can include geometric regularization. Geometric regularization can involve the utilization of reference geometry data and/or an output of a surface prediction model. The geometry regularization can train the generative neural radiance field model to mitigate artifact generation by limiting a distribution considered for color value prediction and density value prediction to a range associated with a realistic geometry range.

20 Claims, 13 Drawing Sheets

(56) References Cited

U.S. PATENT DOCUMENTS

| | | | |
|---|---|---|---|
| 2023/0052645 A1* | 2/2023 | Keller | G06N 3/08 |
| 2023/0137403 A1* | 5/2023 | Gallo | G06V 40/20 |
| | | | 348/47 |

OTHER PUBLICATIONS

Daras, Giannis, et al. "Solving inverse problems with nerfgans." arXiv preprint arXiv:2112.09061 (2021). (Year: 2021).*

International Preliminary Report on Patentability for Application No. PCT/US2022/012252, mailed Jul. 11, 2024, 9 pages.

Hong et al., "HeadNeRF: A Real-time NeRF-based Parametric Head Model", arXiv:2112.05637v3, Apr. 30, 2022, 11 pages.

International Search Report for PCT/US2022/012252, mailed on Sep. 22, 2022, 3 pages.

Chan et al., "pi-GAN: Periodic Implicit Generative Adversarial Networks for 3D-Aware Image Synthesis", arXiv:2012.00926v2, Apr. 5, 2021, 16 pages.

Daras et al., "Solving Inverse Problems with NerfGANs", arXiv:2112.09061v1, Dec. 16, 2021, 16 pages.

Mildenhall et al., "NeRF: Representing Scenes as Neural Radiance Fields for View Synthesis", arXiv:2003.08934v2, Aug. 3, 2020, 25 pages.

* cited by examiner

400

402
(A) FRONTAL-VIEW INPUT 404
(B) pi-GAN 406
(C) EXAMPLE

408

410

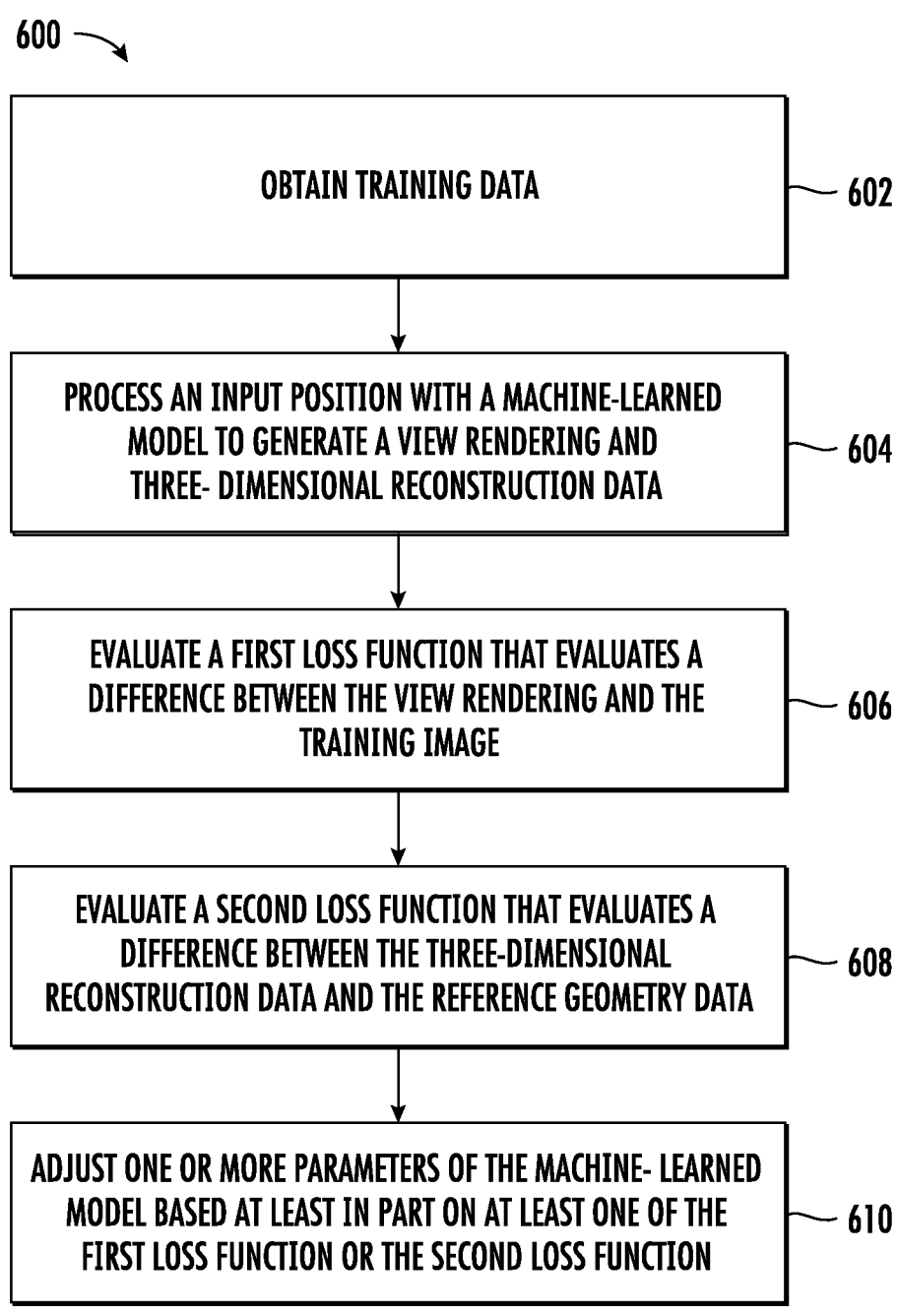

600

OBTAIN TRAINING DATA — 602

PROCESS AN INPUT POSITION WITH A MACHINE-LEARNED MODEL TO GENERATE A VIEW RENDERING AND THREE- DIMENSIONAL RECONSTRUCTION DATA — 604

EVALUATE A FIRST LOSS FUNCTION THAT EVALUATES A DIFFERENCE BETWEEN THE VIEW RENDERING AND THE TRAINING IMAGE — 606

EVALUATE A SECOND LOSS FUNCTION THAT EVALUATES A DIFFERENCE BETWEEN THE THREE-DIMENSIONAL RECONSTRUCTION DATA AND THE REFERENCE GEOMETRY DATA — 608

ADJUST ONE OR MORE PARAMETERS OF THE MACHINE- LEARNED MODEL BASED AT LEAST IN PART ON AT LEAST ONE OF THE FIRST LOSS FUNCTION OR THE SECOND LOSS FUNCTION — 610

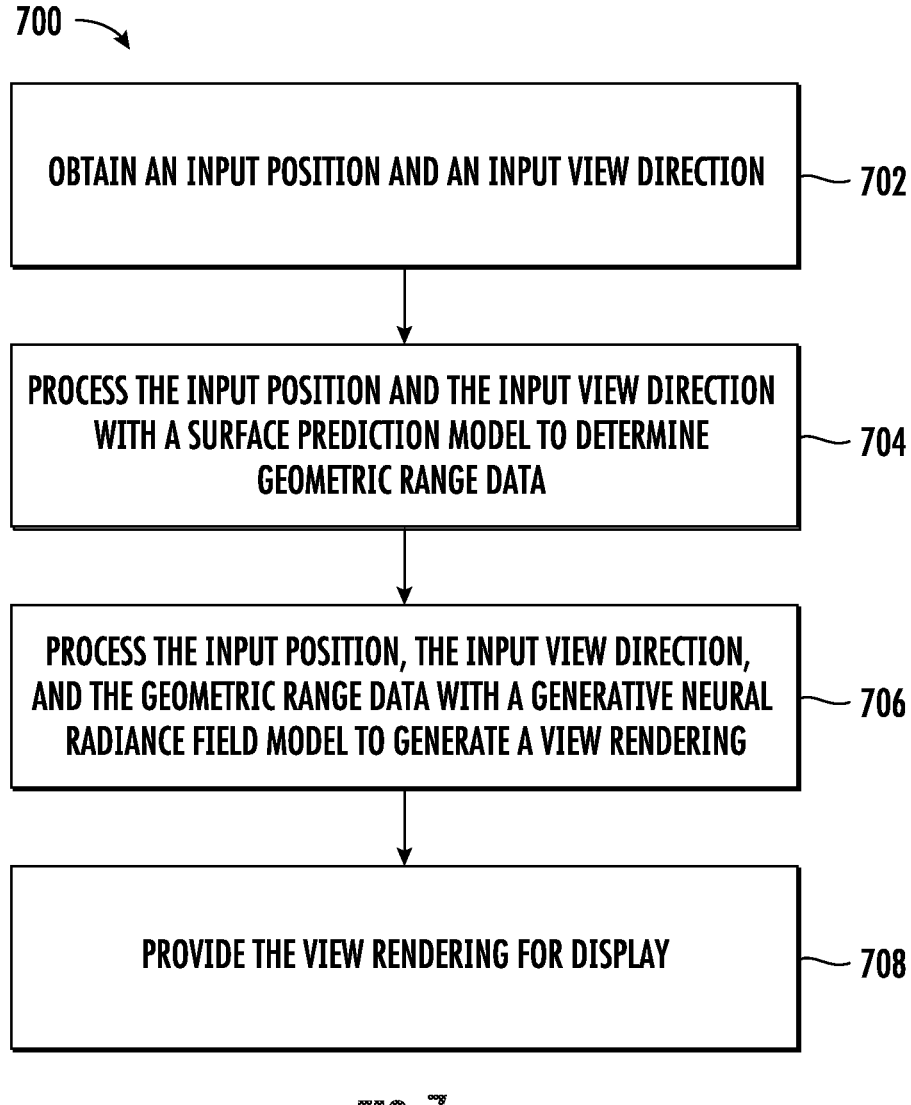

OBTAIN AN INPUT POSITION AND AN INPUT VIEW DIRECTION — 702

PROCESS THE INPUT POSITION AND THE INPUT VIEW DIRECTION WITH A SURFACE PREDICTION MODEL TO DETERMINE GEOMETRIC RANGE DATA — 704

PROCESS THE INPUT POSITION, THE INPUT VIEW DIRECTION, AND THE GEOMETRIC RANGE DATA WITH A GENERATIVE NEURAL RADIANCE FIELD MODEL TO GENERATE A VIEW RENDERING — 706

PROVIDE THE VIEW RENDERING FOR DISPLAY — 708

FIG. 7

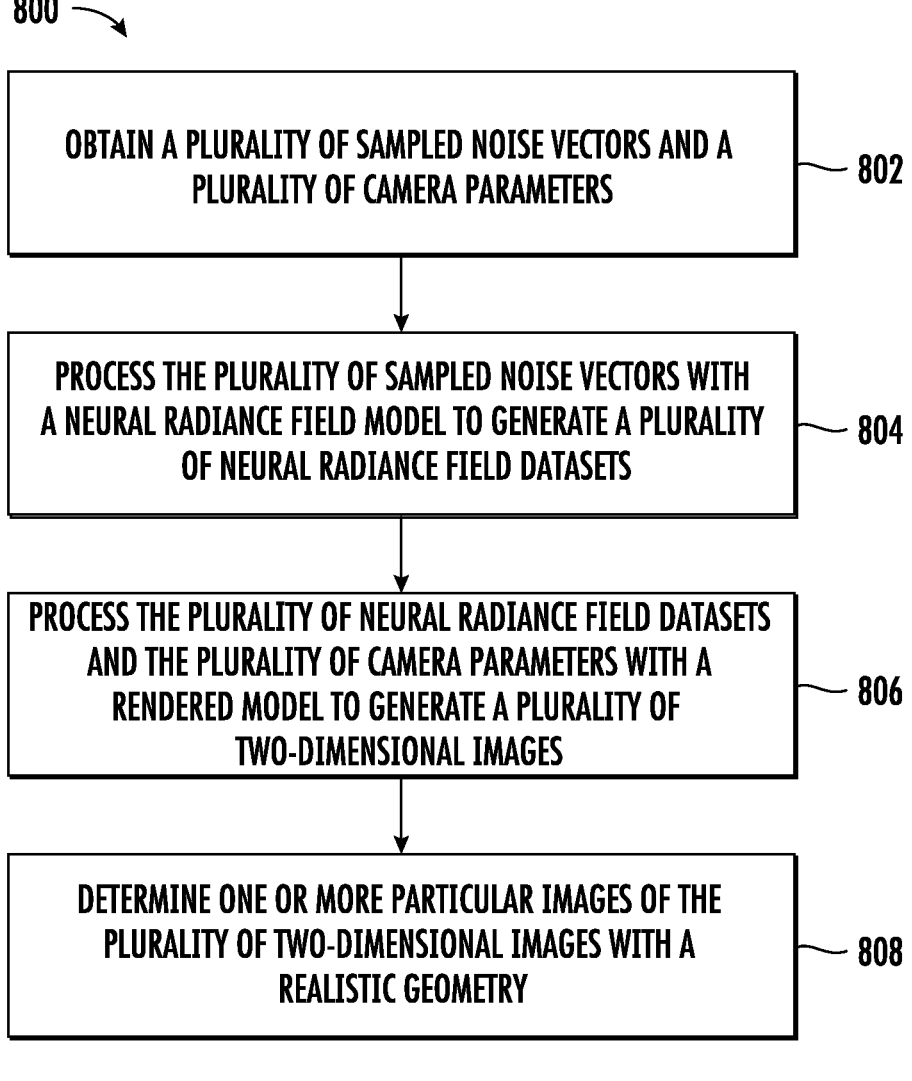

800 ⌐

OBTAIN A PLURALITY OF SAMPLED NOISE VECTORS AND A
PLURALITY OF CAMERA PARAMETERS — 802

PROCESS THE PLURALITY OF SAMPLED NOISE VECTORS WITH
A NEURAL RADIANCE FIELD MODEL TO GENERATE A PLURALITY
OF NEURAL RADIANCE FIELD DATASETS — 804

PROCESS THE PLURALITY OF NEURAL RADIANCE FIELD DATASETS
AND THE PLURALITY OF CAMERA PARAMETERS WITH A
RENDERED MODEL TO GENERATE A PLURALITY OF
TWO-DIMENSIONAL IMAGES — 806

DETERMINE ONE OR MORE PARTICULAR IMAGES OF THE
PLURALITY OF TWO-DIMENSIONAL IMAGES WITH A
REALISTIC GEOMETRY — 808

STEPS

1100
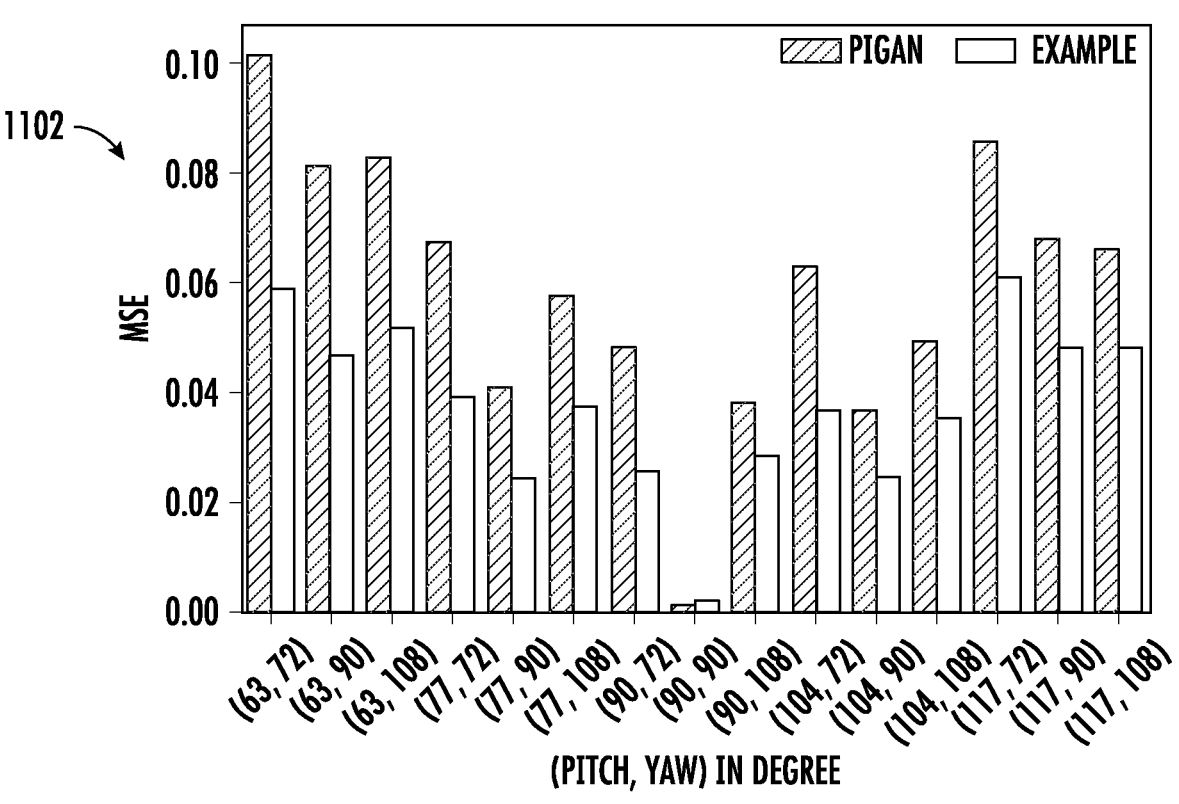
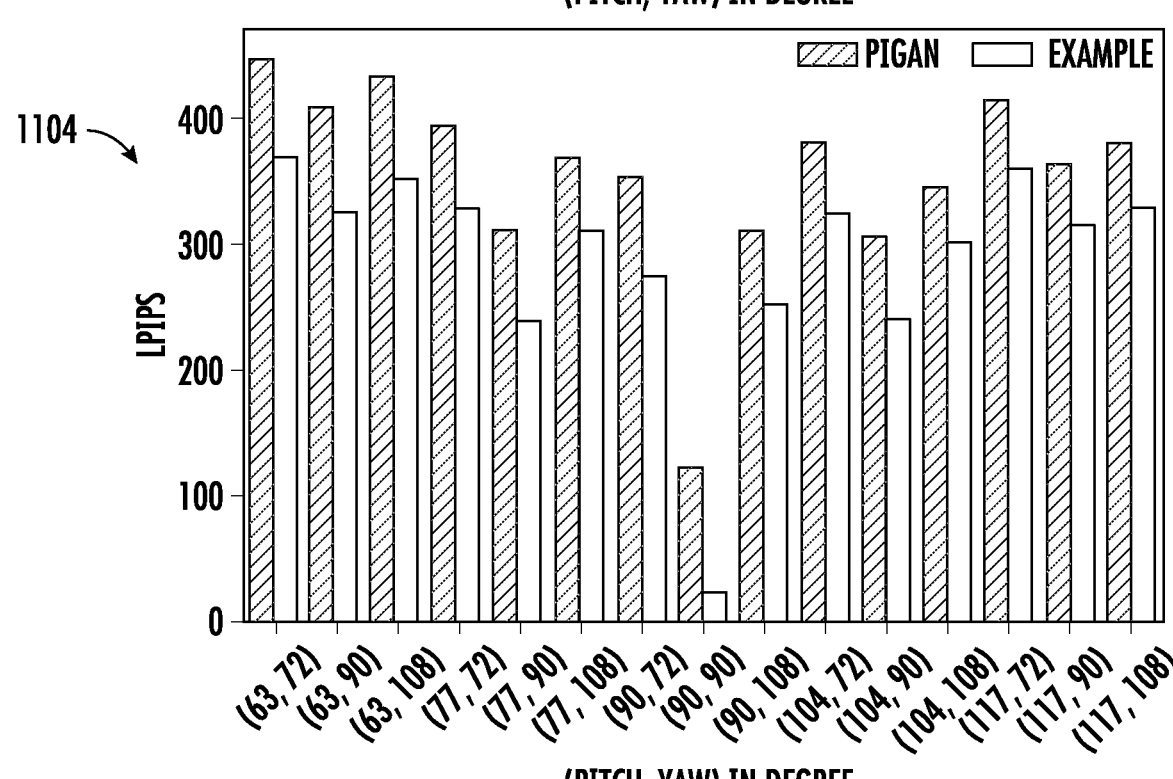
FIG. 11

GENERATIVE MODELING OF THREE DIMENSIONAL SCENES AND APPLICATIONS TO INVERSE PROBLEMS

RELATED APPLICATIONS

The present application claims priority under 35 U.S.C. § 371 to and the benefit of International Patent Application No. PCT/US2022/012252 filed on Jan. 13, 2022, which is based on and claims the right of priority under 35 U.S.C. § 119 to Greek National Application No. 20210100924 having a filing date of Dec. 30, 2021, the disclosures of which are incorporated by reference herein in their entirety for all purposes.

FIELD

The present disclosure relates generally to generative modeling of three-dimensional scenes and applications to inverse problems. More particularly, the present disclosure relates to training a generative neural radiance field model based on reference geometry data and/or an output of a surface prediction model to reduce and/or eliminate artifact generation when generating view renderings and three-dimensional reconstructions.

BACKGROUND

NeRFGAN models have become an increasingly prevalent research topic. However, very little research addresses inverse problems. In particular, there can be various challenges in solving inverse problems with NeRFGANs that can stem from unrealistic three-dimensional structures during inference.

Some approaches can side-step the computational cost of training a traditional NeRFGAN at high resolutions and present promising results in solving inverse problems. As larger and more realistic three-dimensional neural radiance field generators are made possible, solving inverse problems with the models may become increasingly more relevant for numerous applications.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining training data. The training data can include a training image, a respective position associated with the training image, and reference geometry data. In some implementations, the operations can include processing an input position with a machine-learned model to generate a view rendering and three-dimensional reconstruction data. The input position can be associated with an observation space associated with the respective position. The view rendering can include predicted image data descriptive of a scene, and the three-dimensional reconstruction data can be descriptive of predicted three-dimensional geometry. The operations can include evaluating a first loss function that evaluates a difference between the view rendering and the training image and evaluating a second loss function that evaluates a difference between the three-dimensional reconstruction data and the reference geometry data. The operations can include adjusting one or more parameters of the machine-learned model based at least in part on at least one of the first loss function or the second loss function.

In some implementations, the first loss function can include a two-dimensional reconstruction loss, and the two-dimensional reconstruction loss can include a contrastive loss. The operations can include annealing a temperature parameter after adjusting the one or more parameters. The second loss function can include a three-dimensional consistency loss. In some implementations, the training image can include a frontal view of a face. The one or more parameters can include one or more geometry parameters associated with a range of realistic geometries for an input image. In some implementations, adjusting the one or more parameters of the machine-learned model can include training the machine-learned model to generate a color value prediction based at least in part on a range of geometric priors. Adjusting the one or more parameters of the machine-learned model can include training the machine-learned model to generate a density value prediction based at least in part on a range of geometric priors.

In some implementations, the view rendering can include data descriptive of a descriptive of a predicted density value and a predicted color value. The view rendering can include a predicted color value determined at least in part on an integration of a color value distribution in a learned geometric range associated with a three-dimensional voxel grid. The machine-learned model can include a mapping network model configured with feature-wise linear modulation conditioning. In some implementations, the view rendering can include a two-dimensional reconstructed image associated with the respective position. The machine-learned model can include a first model and a second model. The first model can include a surface prediction model, and the second model can include a renderer model. The input position can be determined by sampling a point in the observation space.

Another example aspect of the present disclosure is directed to a computer-implemented method. The method can include obtaining, by a computing system including one or more processors, an input position and an input view direction. The method can include processing, by the computing system, the input position and the input view direction with a surface prediction model to determine geometric range data. The geometric range data can be associated with a predicted range of geometric outcomes. The method can include processing, by the computing system, the input position, the input view direction, and the geometric range data with a generative neural radiance field model to generate a view rendering. The view rendering can include a predicted color value and a predicted density value, and at least one of the predicted color value or the predicted density value can be determined based on a learned neural radiance field and the geometric range data. The method can include providing, by the computing system, the view rendering for display.

In some implementations, the surface prediction model and the generative neural radiance field model can have been jointly trained with a training dataset including one or more training camera parameters and latent encoding data. The generative neural radiance field model can have been trained with a single frontal view image of a face, and the view rendering can include a novel view rendering of the face.

Another example aspect of the present disclosure is directed to one or more non-transitory computer-readable media that collectively store instructions that, when executed by one or more computing devices, cause the one or more computing devices to perform operations. The operations can include obtaining a plurality of sampled noise vectors and a plurality of camera parameters. The operations can include processing the plurality of sampled noise vectors with a neural radiance field model to generate a plurality of neural radiance field datasets. The operations can include processing the plurality of neural radiance field datasets and the plurality of camera parameters with a rendered model to generate a plurality of two-dimensional images and determining one or more particular images of the plurality of two-dimensional images with a realistic geometry.

In some implementations, determining the one or more particular images of the plurality of two-dimensional images with the realistic geometry can include processing the plurality of two-dimensional images with a geometry determination model to determine the one or more particular images. The geometry determination model can be configured to recognize one or more visual concepts. The operations can include training at least one of a surface prediction model or a generative neural radiance field model with geometry data associated with the one or more particular images.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a flow chart diagram of an example method to perform machine-learned model training according to example embodiments of the present disclosure.

FIG. 7 depicts a flow chart diagram of an example method to perform view rendering according to example embodiments of the present disclosure.

FIG. 8 depicts a flow chart diagram of an example method to perform image selection according to example embodiments of the present disclosure.

FIG. 11 depicts an illustration of example model results according to example embodiments of the present disclosure.

Figure 1A:
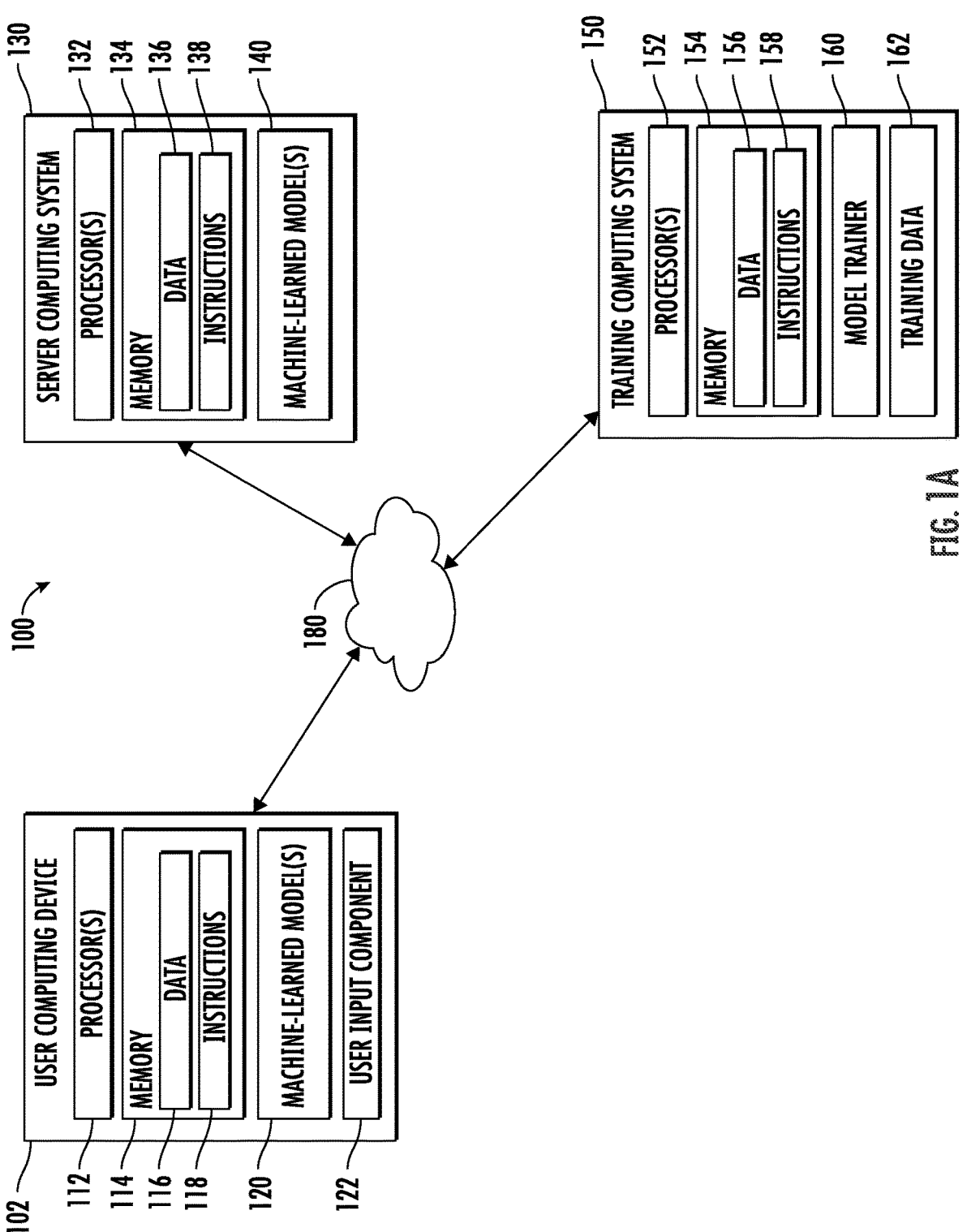
FIG. 1A depicts a block diagram of an example computing system that performs view rendering according to example embodiments of the present disclosure.

Reference numerals that are repeated across plural figures are intended to identify the same features in various implementations.

DETAILED DESCRIPTION

Overview

Generally, the present disclosure is directed to training a generative neural radiance field model with geometry regularization. For example, the systems and methods disclosed herein can train a generative neural radiance field model based on reference geometry data and/or an output of a surface prediction model. In some implementations, the systems and methods can determine and/or select images with realistic geometry for optimizing the model to output geometric realistic outputs.

In some implementations, the generative neural radiance field model can include a machine-learned model. Training the machine-learned model can include obtaining training data. The training data can include a training image, a respective position associated with the training image, and reference geometry data. The reference geometry data can be based on one or more images determined to include realistic geometry and/or good geometry. The systems and methods for training the machine-learned model can process an input position with a machine-learned model to generate a view rendering and three-dimensional reconstruction data. In some implementations, the input position can be associated with an observation space associated with the respective position. Additionally and/or alternatively, the view rendering can include predicted image data descriptive of a scene. The three-dimensional reconstruction data can be descriptive of predicted three-dimensional geometry. A gradient descent can then be generated based on one or more loss functions to then be backpropagated to the machine-learned model to train the model. A first loss function can be evaluated by evaluating a difference between the view rendering and the training image. In some implementations, a second loss function can be evaluated by evaluating a difference between the three-dimensional reconstruction data and the reference geometry data. One or more parameters of the machine-learned model can then be adjusted based at least in part on at least one of the first loss function or the second loss function.

The systems and methods for training the machine-learned model can include obtaining training data. The training data can include a training image, a respective position associated with the training image, and reference geometry data. In some implementations, the training image can include a frontal view of a face. In some implementations, the training data can further include a respective view direction associated with the training image. The training image may be a single frontal view image. Additionally and/or alternatively, the training data can include a plurality of training images, a plurality of respective positions, a plurality of respective view directions, and reference geometry data. The reference geometry data can be based on one or more images determined to include realistic geometry and/or good geometry. The one or more images may include an analogous object or scene to the object or scene depicted in the training image. For example, in some implementations, the one or more images can include one or more objects of a same object class as an object in the training image. The object class may include a face class, and the one or more objects may be different faces.

In some implementations, the reference geometry data may be generated with a surface prediction model that may process latent vector data and/or position data to generate reference geometry data. The reference geometry data may be based in part on one or more image selections by a geometry determination model configured to recognize good and/or realistic geometry based on recognition of a wide variety of visual concepts. The good geometry may be kept as the reference.

The systems and methods can process an input position with a machine-learned model to generate a view rendering and three-dimensional reconstruction data. In some implementations, the input position can be associated with an observation space associated with the respective position. The input position may be determined by sampling a point in the observation space. In some implementations, the input position can be the respective position associated with the training image, and the view rendering can include a two-dimensional reconstructed image associated with the respective position.

In some implementations, the machine-learned model may include a mapping network model configured with feature-wise linear modulation conditioning. Additionally and/or alternatively, the machine-learned model can include a first model and a second model. The first model can include a surface prediction model, and the second model may include a renderer model. The rendered model can include a neural radiance field model influenced at least in part on the output of the surface prediction model.

The view rendering can include predicted image data descriptive of a scene (e.g., a scene with an image, a park, a house, a table, a kitchen, etc.). In some implementations, the view rendering may be descriptive of a face. The view rendering can be a reconstruction of the training image (e.g., a reconstruction of a single frontal view image of a face). Alternatively and/or additionally, the view rendering may be descriptive of a novel view rendering not depicted in the training image. In some implementations, the view rendering can include data descriptive of a descriptive of a predicted density value and a predicted color value. Additionally and/or alternatively, the view rendering may include a predicted color value determined at least in part on an integration of a color value distribution in a learned geometric range associated with a three-dimensional voxel grid. The learned geometric range may be based at least in part on one or more reference images and/or reference geometry.

In some implementations, the three-dimensional reconstruction data is descriptive of predicted three-dimensional geometry.

A first loss function can then be evaluated by evaluating a difference between the view rendering and the training image. The first loss function can include a two-dimensional reconstruction loss. Alternatively and/or additionally, the two-dimensional reconstruction loss may include a contrastive loss. In some implementations the first loss function can include a perceptual loss, an L2 loss, a generative loss, KL Divergence loss, and/or an adversarial loss.

In some implementations, a second loss function can be evaluated by evaluating a difference between the three-dimensional reconstruction data and the reference geometry data. The second loss function can include a three-dimensional consistency loss.

One or more parameters of the machine-learned model can then be adjusted based at least in part on the first loss function and/or the second loss function. In some implementations, the one or more parameters may include one or more geometry parameters associated with a range of realistic geometries for an input image. Additionally and/or alternatively, adjusting the one or more parameters of the machine-learned model can include training the machine-learned model to generate a color value prediction based at least in part on a range of geometric priors.

In some implementations, adjusting the one or more parameters of the machine-learned model may include training the machine-learned model to generate a density value prediction based at least in part on a range of geometric priors.

In some implementations, the systems and methods can include annealing a temperature parameter after adjusting the one or more parameters.

The trained generative neural radiance field model can then be utilized for one or more tasks (e.g., view rendering generation, three-dimensional geometric reconstruction, etc.). For example, the systems and methods can include obtaining an input position and an input view direction. The input position and the input view direction can then be processed with a surface prediction model to determine geometric range data. In some implementations, the geometric range data can be associated with a predicted range of geometric outcomes. The input position, the input view direction, and the geometric range data can then be processed with a generative neural radiance field model to generate a view rendering. The view rendering can include a predicted color value and a predicted density value. In some implementations, the predicted color value and/or the predicted density value can be determined based at least in part on a learned neural radiance field and the geometric range data. The view rendering can then be provided for display.

More specifically, in some implementations, the systems and methods can include obtaining an input position and an input view direction. The input position and the input view direction can be associated with an observation associated with a scene. The scene may include one or more objects for observance. The one or more objects may include one or more faces.

The systems and methods can include processing the input position and the input view direction with a surface prediction model to determine geometric range data. In some implementations, the geometric range data may be associated with a predicted range of geometric outcomes. The surface prediction model may be trained to understand ranges of geometric outcomes for a rendering based on similar geometries to the object or scene being rendered. In some implementations, the geometric range data can include a voxel grid to restrict the color prediction and the density prediction to a set of pixels or voxels in the observation space.

In some implementations, the systems and methods can include processing the input position, the input view direction, and the geometric range data with a generative neural radiance field model to generate a view rendering. The view rendering can include a predicted color value and a predicted density value. The predicted color value and/or the predicted density value may be determined based at least in part on a learned neural radiance field of the generative neural radiance field model and the geometric range data. In some implementations, the generative neural radiance field model may be trained with a single frontal view image of a face. Additionally and/or alternatively, the view rendering may include a novel view rendering of the face.

In some implementations, the geometric range data can be processed with the generative neural radiance field model to limit the distribution being integrated for color value prediction and density value prediction. For example, the geometric range data can limit the consideration of only a subset of a distribution for color value prediction and/or density value prediction.

The view rendering can then be provided for display. Providing for display can include sending the view rendering to a user computing device and/or may include displaying the view rendering as an image via a visual display.

In some implementations, the surface prediction model and the generative neural radiance field model may have been jointly trained with a training dataset. The training dataset may include one or more training camera parameters and latent encoding data. The latent encoding data may include one or more latent vectors. In some implementations, the latent vectors can include noise vectors.

In some implementations, reference geometry data utilized for training the generative neural radiance field model can be determined and/or generated based on one or more systems and methods for reference geometry determination. The systems and methods can include obtaining a plurality of sampled noise vectors and a plurality of camera parameters. The plurality of sampled noise vectors can be processed with a neural radiance field model to generate a plurality of neural radiance field datasets. In some implementations, the plurality of neural radiance field datasets and the plurality of camera parameters can be processed with a rendered model to generate a plurality of two-dimensional images. The systems and methods can include determining one or more particular images of the plurality of two-dimensional images with a realistic geometry.

More specifically, in some implementations, the systems and methods can include obtaining a plurality of sampled noise vectors and a plurality of camera parameters. The plurality of camera parameters can include a plurality of three-dimensional positions and a plurality of two-dimensional view directions.

In some implementations, the systems and methods can include processing the plurality of sampled noise vectors with a neural radiance field model to generate a plurality of neural radiance field datasets. The plurality neural radiance field datasets can include a plurality of five-dimensional functions. The five-dimensional functions can be descriptive of three-dimensional positions, two-dimensional view directions, color values, appearance embeddings, shape embeddings, and/or volume density values.

The plurality of neural radiance field datasets and the plurality of camera parameters can then be processed with a rendered model to generate a plurality of two-dimensional images. The plurality of two-dimensional images can include reconstruction images and/or novel view renderings. For example, the plurality of two-dimensional images can include a plurality of different facial views of a plurality of different faces.

In some implementations, the systems and methods can include determining one or more particular images of the plurality of two-dimensional images with a realistic geometry and/or a desired geometry. Determining the one or more particular images can include processing the plurality of two-dimensional images with a geometry determination model to determine the one or more particular images. In some implementations, the geometry determination model can be configured to recognize one or more visual concepts.

Additionally and/or alternatively, the systems and methods can include training a surface prediction model and/or a generative neural radiance field model with geometry data associated with the one or more particular images.

In some implementations, the systems and methods can train the generative neural radiance field model with a geometry regularization. The geometry regularization can be enforced and/or implemented by generating a voxelized representation of the three-dimensional observational space. For example, the observational space can include a plurality of points that can be encompassed by a plurality of voxels (e.g., pixel by pixel grids). The points of the scene can be utilized to generate a voxelized representation of the scene. The voxelized representation can be a three-dimensional representation. Portions of the voxelized representation can be confined in one or more voxel grids.

The geometric regularization can include obtaining one or more latent vectors associated with the density values. The inferred geometry can then be regularized towards a suitable geometry in a realistic dataset (e.g., a most suitable geometry of an example image of a same or similar object class or scene class).

In some implementations, geometric regularization can include determining a realistic range of geometric outcomes for a rendering or three-dimensional representation (e.g., a mean three-dimensional geometry with a standard deviation for error and/or for variance). The range can then be utilized to confine value consideration for predictions to a range of distributions associated with the range of outcomes. The regularization can therefore mitigate artifacts by removing outliers outside of the range of outcomes.

The range of outcomes may be refined and narrowed throughout training until an ideal geometry is found, determined, or chosen.

In some implementations, the systems and methods disclosed herein can be utilized to improve the training and sampling time of existing three-dimensional generative models by using a predictor that can identify the location of surfaces of a scene given the latent code associated with each scene. The systems and methods presented herein can include a multi-worker distributional training strategy, enabling model training at an unprecedented scale. The fast rendering of the radiance field and a custom distribution strategy can allow the system to train the models quickly with very high-resolution images.

In some implementations, the systems and methods can solve inverse problems in a multi-view consistent manner. The systems and methods can train a network to identify whether two images are views of the same scene using a contrastive loss. The systems and methods can add the trained identification network to the optimization loop to achieve three-dimensional consistent solutions to inverse problems.

The systems and methods of the present disclosure provide a number of technical effects and benefits. As one example, the system and methods can train a generative neural radiance field model to generate view renderings and reconstruct three-dimensional data. More specifically, the systems and methods can utilize learned geometric priors to regularize the outputs of generative neural radiance field models. The geometric priors can be determined by processing a plurality of vectors and a plurality of camera parameters to generate a plurality of rendered images, which can be processed to determine particular images with realistic geometry. The geometry data of the particular images can then be utilized to train a surface prediction model. The surface prediction model can then influence the predictions of the neural radiance field model, which can therefore mitigate the generation of artifacts in view renderings and volume representations.

Another technical benefit of the systems and methods of the present disclosure is the ability to generate novel view facial renderings using a model trained on a single frontal view image of a face. For example, the generative neural radiance field models may be trained on the single frontal view image by backpropagating a gradient descent resulting from two loss functions. The first loss function can evaluate a difference between a reconstructed two-dimensional image and the ground truth single frontal view image. The second loss function can evaluate a difference between a reconstructed three-dimensional geometry and one or more reference geometries.

Another example technical effect and benefit relates to the reduction of computational cost and computational time. The systems and methods disclosed herein can utilize a surface prediction model and/or reference geometry data to reduce the range of a distribution being integrated for the color value prediction and/or the density value prediction. For example, the reference geometry data and/or the output of the surface prediction model can provide context to an expected range of possibilities to consider for determining the predicted values.

With reference now to the Figures, example embodiments of the present disclosure will be discussed in further detail.

Example Devices and Systems

FIG. 1A depicts a block diagram of an example computing system 100 that performs view rendering according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more generative neural radiance field models 120. For example, the generative neural radiance field models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example generative neural radiance field models 120 are discussed with reference to FIGS. 2-8.

In some implementations, the one or more generative neural radiance field models 120 can be received from the server computing system 130 over network 180, stored in the user computing device memory 114, and then used or otherwise implemented by the one or more processors 112. In some implementations, the user computing device 102 can implement multiple parallel instances of a single generative neural radiance field model 120 (e.g., to perform parallel view rendering across multiple instances of positions and/or view directions).

More particularly, the generative neural radiance field model can intake a position and a view direction (e.g., a three-dimensional position in an observational space and a two-dimensional view direction) and output a view rendering and/or a three-dimensional reconstruction.

Additionally or alternatively, one or more generative neural radiance field models 140 can be included in or otherwise stored and implemented by the server computing system 130 that communicates with the user computing device 102 according to a client-server relationship. For example, the generative neural radiance field models 140 can be implemented by the server computing system 140 as a portion of a web service (e.g., a view rendering service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned generative neural radiance field models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-8.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the generative neural radiance field models 120 and/or 140 based on a set of training data 162. The training data 162 can include, for example, one or more training images (e.g., a single frontal view of a face), one or more respective positions, one or more respective view directions, and reference geometry data. In some implementations, the reference geometry data can be replaced with or complemented with one or more latent vectors. Additionally and/or alternatively, training and/or model inferencing may involve the use of a surface prediction model that can determine a range of outcomes based on known geometric priors of similar or the same object or scene.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a classification output. As another example, the machine-learned model(s) can process the text or natural language data to generate a semantic intent output. As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The systems and methods can utilize one or more neural radiance field models. Neural radiance field models can be trained and/or configured to process a three-dimensional position and a two-dimensional view direction to generate and/or determine a predicted color and a predicted volume density. The predicted color and the predicted volume density can be determined based on a five-dimensional function. The five-dimensional function can be learned by training based on comparisons between a training output and one or more ground truth images. In some implementations, the predicted color and/or the predicted volume density can be determined based on an integration over a distribution (e.g., a color probability distribution or a volume density probability distribution).

In some implementations, the systems and methods disclosed herein can reduce the size of the distribution being integrated over based on reference geometry data, an output of a surface prediction model, and/or geometric priors.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
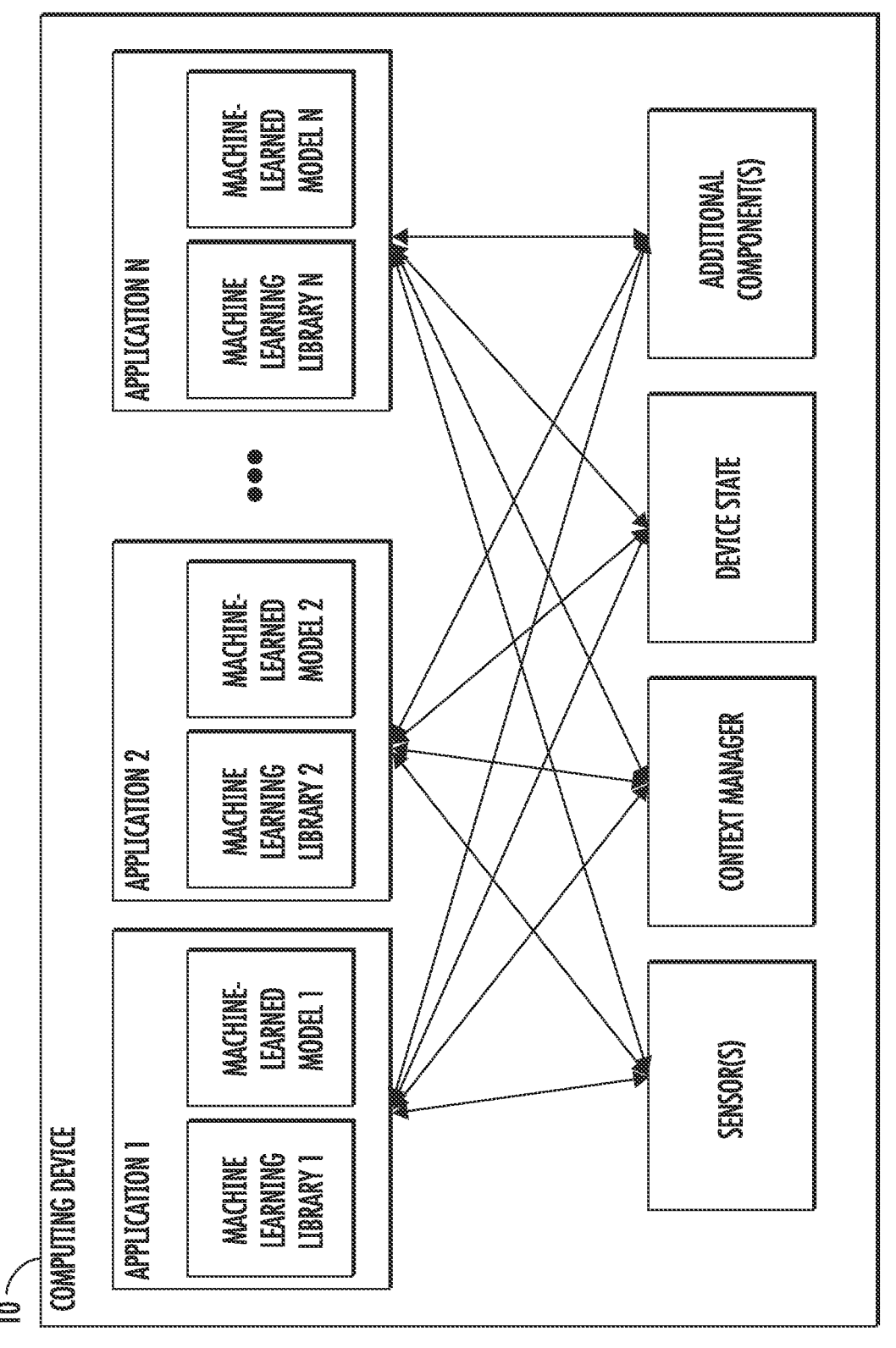
FIG. 1B depicts a block diagram of an example computing device that performs view rendering according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
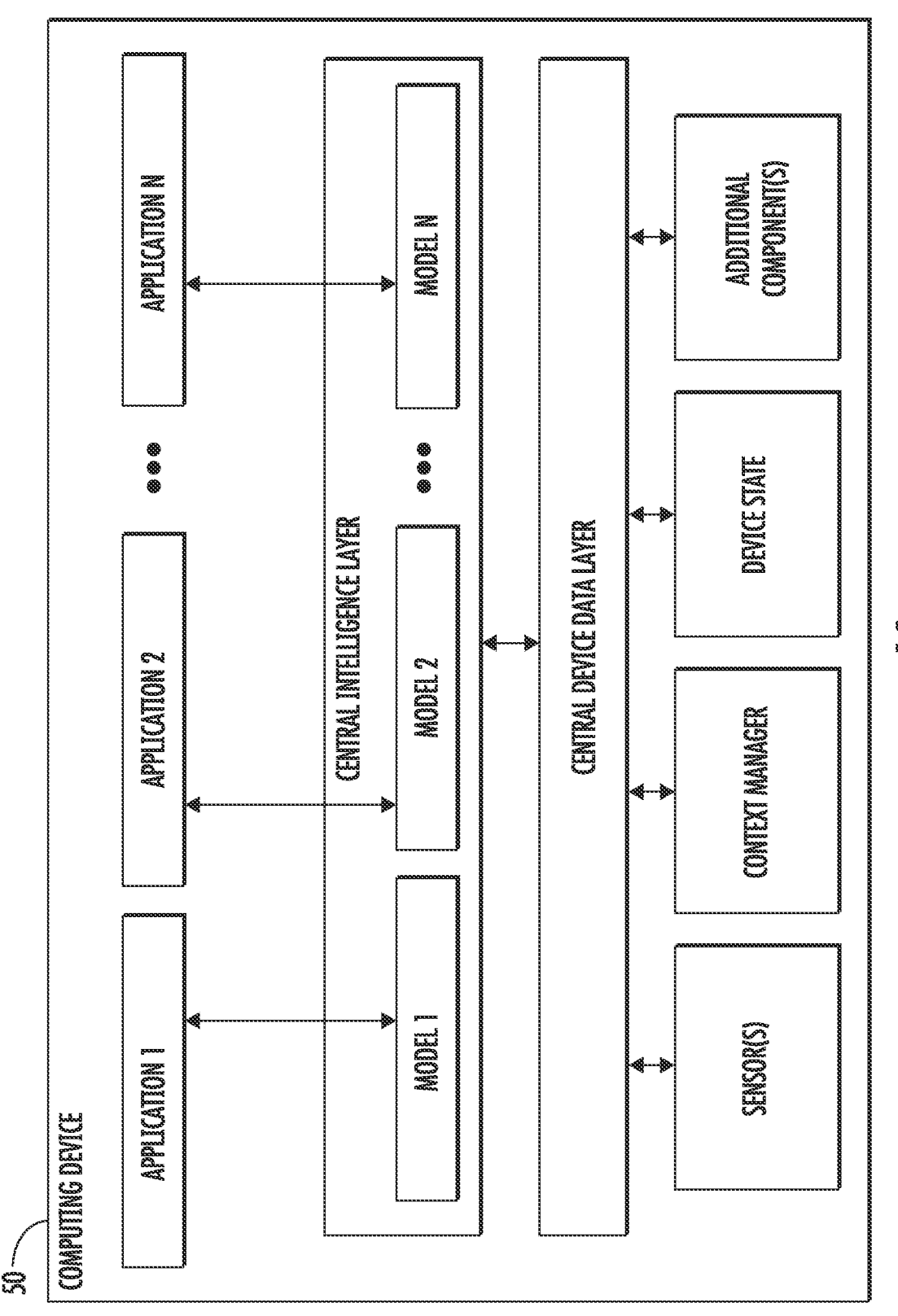
FIG. 1C depicts a block diagram of an example computing device that performs view rendering according to example embodiments of the present disclosure.

FIG. 1C depicts a block diagram of an example computing device 50 that performs according to example embodiments of the present disclosure. The computing device 50) can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
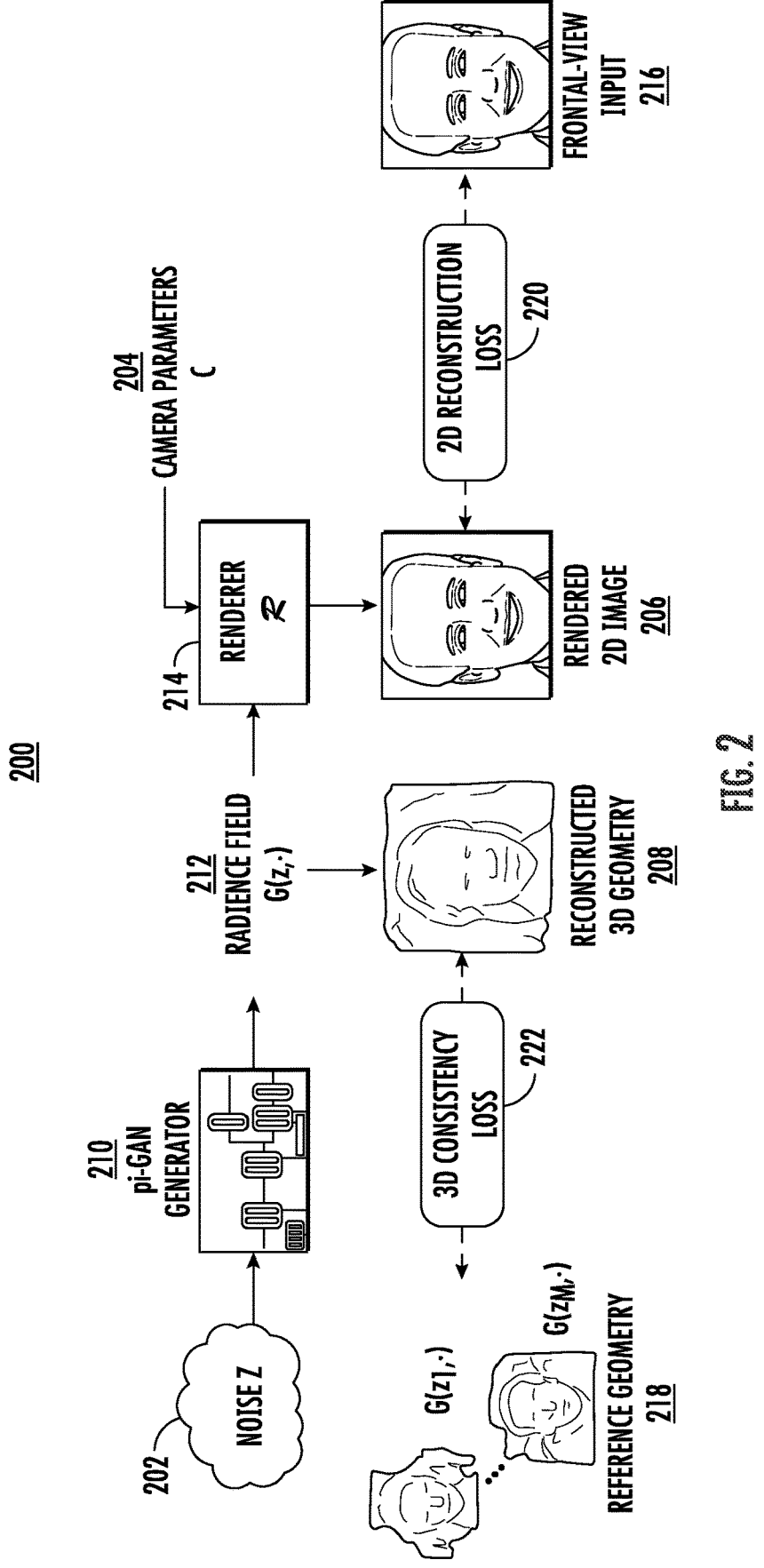
FIG. 2 depicts a block diagram of an example generative neural radiance field model according to example embodiments of the present disclosure.

FIG. 2 depicts a block diagram of an example generative neural radiance field model 200 according to example embodiments of the present disclosure. In some implementations, the generative neural radiance field model 200 is trained to receive a set of input data 204 descriptive of one or more camera parameters and, as a result of receipt of the input data 204, provide output data 206 that can include one or more rendered two-dimensional images. Thus, in some implementations, the generative neural radiance field model 200 can include a renderer model 214 that is operable to render the two-dimensional images based on radiance field data 212.

The generative neural radiance field model 200 can be and/or can include one or more machine-learned models. Training the generative neural radiance field model can include obtaining one or more camera parameters 204 (e.g., one or more positions and one or more view directions, one or more latent vectors 202 (e.g., one or more noise vectors), one or more training images 216 (e.g., one or more frontal view images), and reference geometry data 218 (e.g., one or more reference geometry datasets descriptive of three-dimensional geometry for one or more faces).

The latent vectors 202 can be processed with a neural radiance field model 210 (e.g., a pi-GAN model including one or more feature-wise linear modulation blocks) to generate radiance field data 212. The radiance field data can then be utilized to generate reconstructed three-dimensional geometry 208. Additionally and/or alternatively, the radiance field data 212 and the input data 204 (e.g., the camera parameters) can be processed with a renderer model 214 to generate a rendered two-dimensional image 206.

The rendered two-dimensional image 206 and the reconstructed three-dimensional geometry 208 can then be utilized to evaluate one or more loss functions. For example, the rendered two-dimensional image 206 can be compared with a training image 216 to evaluate a two-dimensional reconstruction loss 220. Additionally and/or alternatively, the reconstructed three-dimensional geometry 208 can be compared with the reference geometry data 218 to evaluate a three-dimensional consistency loss 222. The evaluations can be used to generate a two-dimensional gradient descent and a three-dimensional gradient descent. The gradient descents can then be backpropagated to adjust one or more parameters of the generative neural radiance field model 200.

In particular, FIG. 2 can depict an overview of an example method according to implementations disclosed herein. The systems and methods can jointly optimize over two-dimensional reconstruction of the input image 216 and three-dimensional consistency of the radiance field 212. Given a randomly sampled noise vector z 202 from a Gaussian distribution, the systems and methods can obtain a radiance field $G(z, \bullet)$ 212 via the pi-GAN generator G 210 and rendered two-dimensional images 206 using a conventional volumetric renderer R 214 for given camera parameters c 204.

Figure 3:
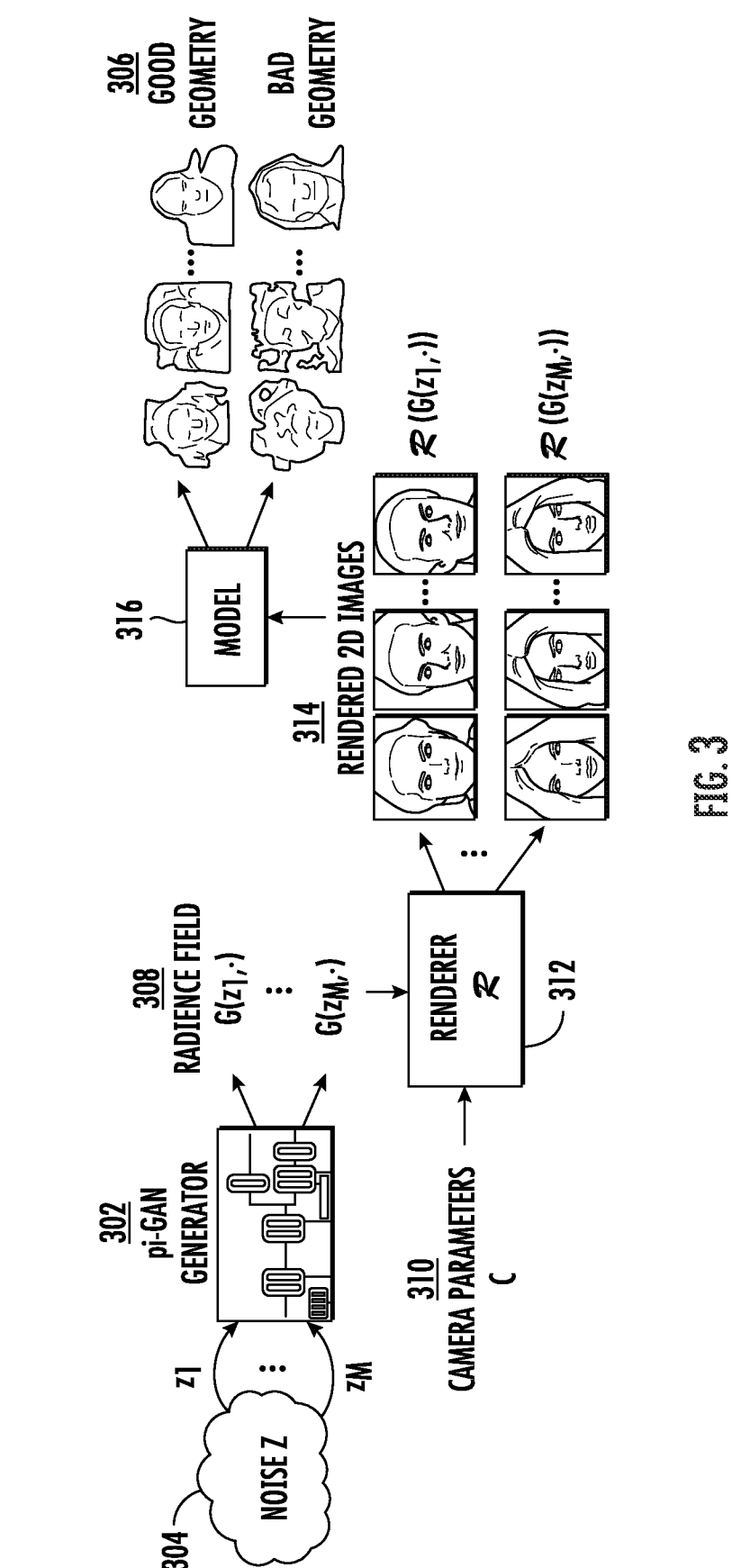
FIG. 3 depicts a block diagram of an example geometry determination model according to example embodiments of the present disclosure.

FIG. 3 depicts a block diagram of an example geometry determination model 300 according to example embodiments of the present disclosure. In some implementations, the geometry determination model 300 is trained to receive a set of input data 304 descriptive of a one or more latent vectors (e.g., one or more noise vectors) and, as a result of receipt of the input data 304, provide output data 306 that can be utilized for training a generative neural radiance field model and/or a surface prediction model. Thus, in some implementations, the geometry determination model 300 can include a pre-trained geometry determination model 302 that is operable to determine whether an image includes realistic geometry.

Reference geometry data for training one or more machine-learned models can be selected or determined by utilizing a plurality of different techniques. One generation and/or determination method can involve the use of a geometry determination model 300.

The generation process can include obtaining input data 304 (e.g., one or more latent vectors) and one or more camera parameters 310 (e.g., one or more positions and one or more view directions). The input data 304 can be processed by a radiance field model 302 to generate one or more radiance fields 308. The radiance fields 308 and the camera parameters 310 can then be processed with a renderer model 312 to generate a plurality of rendered two-dimensional images 314. The plurality of rendered two-dimensional images 316 can then be processed with a pre-trained geometry determination model 316 to determine if each image has good geometry (e.g., realistic geometry) or bad geometry. The good geometry 306 images may be selected to generate reference geometry data for training one or more machine-learned models.

In particular, FIG. 3 can depict candidate selection for reference geometry. The systems and methods can include a systematic process to pick reference geometries 306, which can enable computation of the three-dimensional consistency loss. Given rendered two-dimensional images 314 from randomly sampled noise vectors $\{z_1, \ldots, z_M\}$ 304, the systems and methods can classify "good" vs "bad" geometries 306 based on which two-dimensional images 314 satisfy a pre-trained geometry determination model 316 that recognizes a wide variety of visual concepts. The good geometry can then be kept as the reference.

Figure 4:
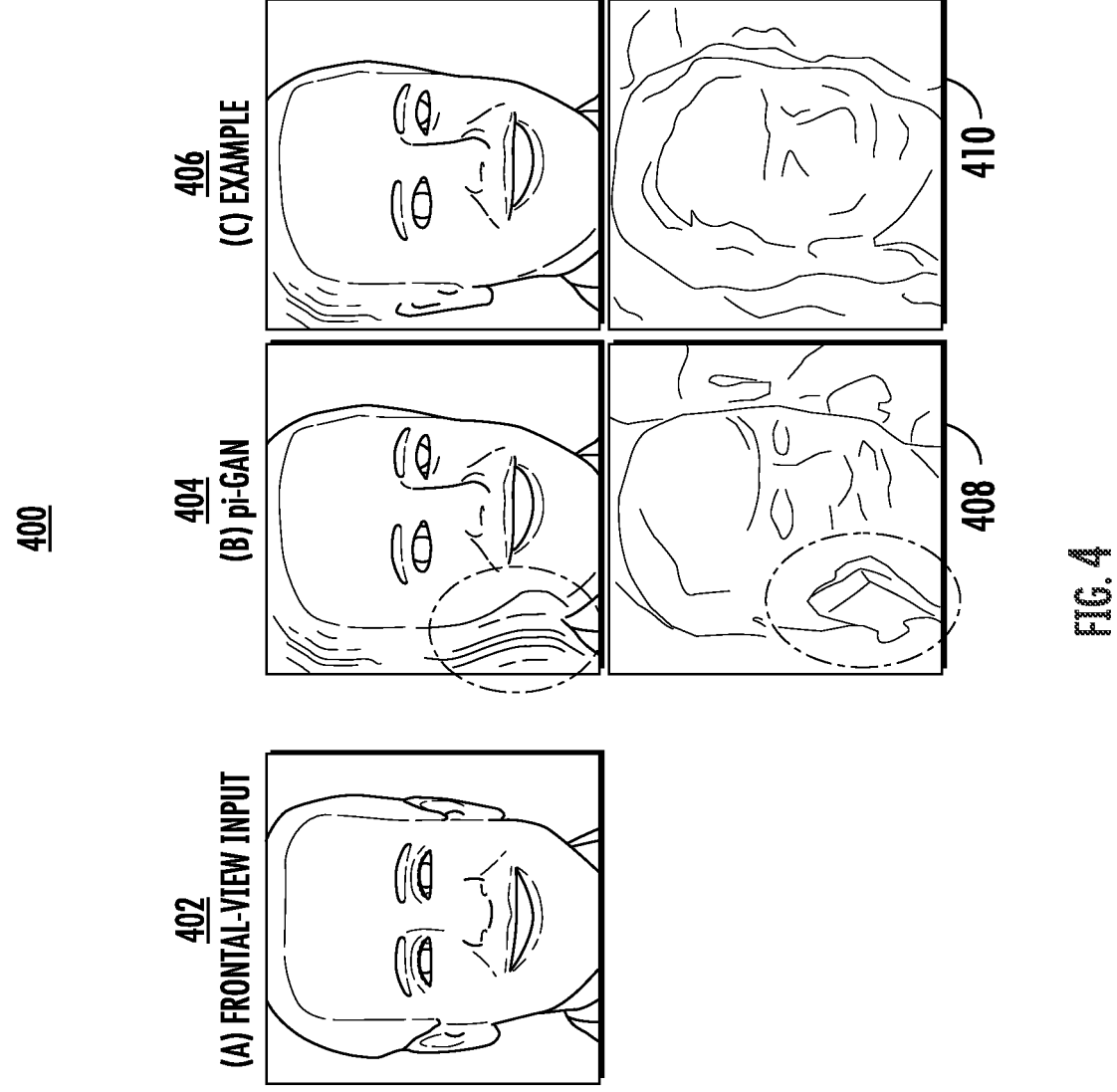
FIG. 4 depicts an illustration of example model outputs according to example embodiments of the present disclosure.

FIG. 4 depicts an illustration of example model outputs according to example embodiments of the present disclosure.

In particular, FIG. 4 can depict an example NerfGAN inversion 400. Given a single frontal view image 402, the systems and methods can generate novel angle views 404 & 406 and the underlying three-dimensional geometry 408 & 410. As shown, latent space optimization as proposed in pi-GAN can create obstructions (stones) (e.g., the circled sections) that can produce artifacts in novel views. The middle column can illustrate the artifacts in the rendered image (top row) 404 and the three-dimensional geometry (bottom row) 408. The example inversion algorithm according to systems and methods disclosed herein can remove these issues by optimizing over both the two-dimensional view 406 and the three-dimensional shape 410 of the radiance field. The middle column can depict a reconstructed three-dimensional geometry 408 and a novel view 404 using pi-GAN direct latent space optimization. The right column can depict generated three-dimensional structure 410 and novel view 406 using the proposed reconstruction algorithm. The systems and methods can emphasize that the example algorithm can also use the same generator (pi-GAN), but may recover a better latent vector compared to direct latent-space optimization. This can lead to a better three-dimensional geometry reconstruction and better two-dimensional novel views.

Figure 5:
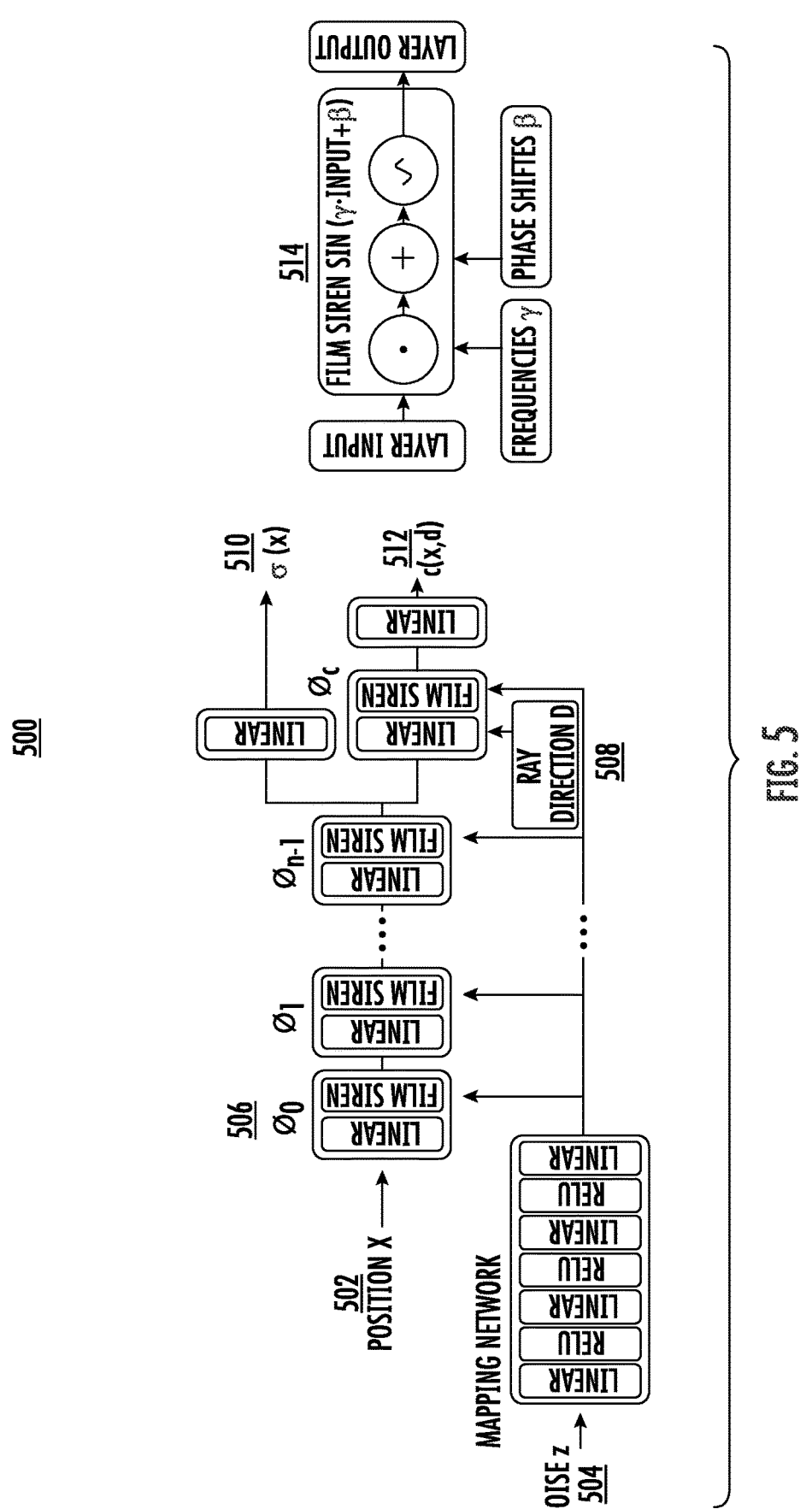
FIG. 5 depicts a block diagram of an example generative neural radiance field model according to example embodiments of the present disclosure.

FIG. 5 depicts a block diagram of an example generative neural radiance field model 500. The generative neural radiance field model 500 can be trained using a process similar to the process depicted in FIG. 2. In particular, FIG. 5 can depict a plurality of blocks that can process data to generate a view rendering. For example, an upper-pipeline 506 can include one or more linear blocks and one or more feature-wise linear modulation block, and a lower pipeline (e.g., the mapping network model pipeline) 508 can include one or more linear blocks and one or more ReLU blocks.

The input can include a position 502 and noise data (e.g., a latent vector) 504. The position 502 can be processed with the upper pipeline 506 conditioned based on one or more outputs of the lower pipeline 508. For example, the noise data 504 can be processed with a mapping network model (e.g., a mapping network model with one or more linear blocks and one or more ReLU blocks) to generate a latent encoding output. The position 502 can then be processed by a linear block to generate a linear block output. The linear block output can then be processed with a feature-wise linear modulation block conditioned on the latent encoding data to generate a second output. The processing can occur iteratively.

The second output can then be processed by a linear block to generate volume density data 510. In some implementations, the second output can be processed with a linear block, a feature-wise linear modulation block conditioned on latent encoding data, and another linear block to generate color data 512. The latent encoding data can include ray direction data.

The feature-wise linear modulation block 514 can intake a layer input and output a layer output. The layer input can be processed based on frequency data and phase shift data associated with the latent encoding data.

In some implementations, the ReLU blocks can include one or more multi-layer perceptron sub-blocks.

Example Methods

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain training data. The training data can include a training image, a respective position associated with the training image, and reference geometry data. In some implementations, the training image may include one or more faces. Additionally and/or alternatively, the training image may include a single frontal view of the face.

At 604, the computing system can process an input position with a machine-learned model to generate a view rendering and three-dimensional reconstruction data. The input position may be associated with an observation space associated with the respective position. The view rendering can include predicted image data descriptive of a scene, and the three-dimensional reconstruction data can be descriptive of a predicted three-dimensional geometry of the scene. In some implementations, the input position may be randomly sampled from the observational space. Alternatively and/or additionally, the input position may be the same position as the respective position associated with the training image. In some implementations, the view rendering can include data descriptive of a descriptive of a predicted density value and a predicted color value.

The view rendering may include a predicted color value determined at least in part on an integration of a color value distribution in a learned geometric range associated with a three-dimensional voxel grid. In some implementations, the view rendering comprises a two-dimensional reconstructed image associated with the respective position.

Additionally and/or alternatively, the machine-learned model can include a mapping network model configured with feature-wise linear modulation conditioning. In some implementations, the machine-learned model can include a first model and a second model. The first model can include a surface prediction model, and the second model may include a renderer model.

At 606, the computing system can evaluate a first loss function that evaluates a difference between the view rendering and the training image. In some implementations, the first loss function can include a two-dimensional reconstruction loss, and the two-dimensional reconstruction loss may include a contrastive loss.

At 608, the computing system can evaluate a second loss function that evaluates a difference between the three-dimensional reconstruction data and the reference geometry data. In some implementations, the second loss function can include a three-dimensional consistency loss.

At 610, the computing system can adjust one or more parameters of the machine-learned model based at least in part on at least one of the first loss function or the second loss function. In some implementations, the one or more parameters can include one or more geometry parameters associated with a range of realistic geometries for an input image. Adjusting the one or more parameters of the machine-learned model can include training the machine-learned model to generate a color value prediction based at least in part on a range of geometric priors. Additionally and/or alternatively, adjusting the one or more parameters of the machine-learned model can include training the machine-learned model to generate a density value prediction based at least in part on a range of geometric priors.

In some implementations, the computing system can anneal a temperature parameter after adjusting the one or more parameters. The training process may be repeated iteratively, and for each iteration, annealing may occur until a single reference geometry may be used for geometric regularization.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain an input position and an input view direction. The input position and the input view direction can be input by a user using a user computing device and/or may be randomly selected. The input position can be associated with a three-dimensional position in an observational space. Additionally and/or alternatively, the view direction can be a two-dimensional view direction associated with the input position.

At 704, the computing system can process the input position and the input view direction with a surface prediction model to determine geometric range data. The geometric range data can be descriptive of a range of possible geometric outcomes associated with geometries associated with similar scenes or objects.

At 706, the computing system can process the input position, the input view direction, and the geometric range data with a generative neural radiance field model to generate a view rendering. The view rendering can include a predicted color value and a predicted density value. In some implementations, the view rendering can include a two-dimensional image. The predicted color value and/or the predicted density value may be determined by integrating over a portion of a distribution associated with a learned neural radiance field. The portion can be selected based at least in part on the geometric range data.

In some implementations, the surface prediction model and the generative neural radiance field model may have been jointly trained with a training dataset including one or more training camera parameters and latent encoding data. Alternatively and/or additionally, the generative neural radiance field model may have been trained with a single frontal view image of a face, and the view rendering may include a novel view rendering of the face.

At 708, the computing system can provide the view rendering for display. Providing for display can involve providing the view rendering as an image displayed on a visual display of a computing device.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a plurality of sampled noise vectors and a plurality of camera parameters.

At 804, the computing system can process the plurality of sampled noise vectors with a neural radiance field model to generate a plurality of neural radiance field datasets.

At 806, the computing system can process the plurality of neural radiance field datasets and the plurality of camera parameters with a rendered model to generate a plurality of two-dimensional images.

At 808, the computing system can determine one or more particular images of the plurality of two-dimensional images with a realistic geometry. Determining the one or more particular images can include processing the plurality of two-dimensional images with a geometry determination model to determine the one or more particular images. The geometry determination model can be configured to recognize one or more visual concepts.

In some implementations, the computing system can train at least one of a surface prediction model or a generative neural radiance field model with geometry data associated with the one or more particular images.

Example Implementations

The systems and methods disclosed herein can leverage different techniques and unsupervised methods for inverse problems using pre-trained generative models. For example, the systems and methods can leverage a pre-trained generator and hence may avoid the computational overhead of training an end-to-end supervised network to go from observations to three-dimensional geometry. There can be various benefits of using unsupervised methods for solving inverse problems including robustness to data structure shifts and unknown variations in the corruption process.

Inversion algorithms can involve building on latent space optimization, and the systems and methods may extend the inverse algorithms using Perceptual Loss and Geodesic regularization for frequencies. The systems and methods disclosed herein can include a three-dimensional regularization term which can be directly applied in the neural radiance field.

The systems and methods disclosed herein can be utilized for solving inverse problems for three-dimensional neural radiance fields given a single two-dimensional view. The systems and methods can include a framework that naturally generalizes even if a partial or corrupted two-dimensional view is available and can extend on existing work on unsupervised methods for inverse problems. In particular, the systems and methods can include regularizing the neural radiance field using reference geometries. The systems and methods can be applicable to generative neural radiance field methods and can improve in performance as more powerful pre-trained NerfGANs become available.

In some implementations, the systems and methods can include a framework for solving inverse problems using NeRF-style generative models. The systems and methods can solve the problem of three-dimensional scene reconstruction given a single two-dimensional image and known camera parameters. An additional problem can involve naively optimizing the latent space which can lead to artifacts and poor novel view rendering. The problem may be attributed to volume obstructions that become visible in novel views but are clearly visible in the three-dimensional geometry.

The systems and methods can include a radiance field regularization method to obtain better three-dimensional surfaces and improved novel views given single view observations. The systems and methods can naturally extend to general inverse problems including inpainting where one observes only partially a single view:

The systems and methods can achieve visual improvements and performance boosts over the baselines in a wide range of tasks. In some implementations, the methods can achieve 30-40% MSE reduction and 15-25% reduction in LPIPS loss compared to the previous state of the art.

Generative models can become capable of generating extremely high-fidelity images of the two-dimensional world. Despite their wide success, current generative models can often fail to capture the three-dimensional structure of the represented scenes and can offer limited control over the geometrical properties of the generated images.

NerfGANs can be considered a new family of generative models that directly model the three-dimensional space by leveraging the success of Neural Radiance Fields (NeRFs). NerfGANs can generate three-dimensional structure in the form of a Neural Radiance Field and can then output two-dimensional images by rendering the field from different camera views. These models may not yet be as competitive as state-of-the-art two-dimensional models for image generation. However, their ability to model directly the three-dimensional space, offers many new possibilities, can extend beyond generating photo-realistic images, that may not yet be fully explored.

The systems and methods can include the solution of inverse problems using pretrained NeRF-style generative adversarial models (Nerf-GANs). The problem of single-view inversion can include: given a single two-dimensional image (e.g., a photograph of a person) the system may be configured to create novel views and reconstruct the three-dimensional geometry leveraging a pre-trained NerfGAN (e.g., the pi-GAN model). The systems and methods may be denoted with G (z, p) a 3D NerfGAN that takes a latent vector $z \in \mathbb{R}^k$ and a three-dimensional space position p in $\mathbb{R}^3$ and can output a color and a density value. For a given latent vector z, the NerfGAN scene can be rendered as a two-dimensional image for any camera position. Formally, for a given camera position c the produced two-dimensional image can be denoted by R (c, G (z, •)), where R can be the rendering operator. Given a single target image x* and known camera parameters c, NerfGAN inversion can be the problem of finding the optimal latent code z* that can create a 3D scene that renders to x*.

A natural method for NerfGAN inversion (used in pi-GAN) can be to optimize the latent vector to match the observed target image:

$$\min_z \|R(c, G(z, \cdot)) - x^*\|. \tag{1}$$

The produced neural radiance field can render correctly to the given target image x*, but even small rotations may produce significant artifacts in novel views. A single front view can be given, and a radiance field can be reconstructed using latent space optimization. The neural fields created by solving the inverse problem can often have three-dimensional obstructions (that may be referred to as stones) that are invisible in the frontal view because of their color pattern. These obstructions can create significant artifacts that become more pronounced in rotated views.

Similar issues can be raised for the pi-GAN model which can be observed to have inverted hollow-face artifacts but not obstructions. Solving inverse problems using direct latent space optimization can frequently produce unrealistic three-dimensional obstructions that can also lead to visual artifacts when rendered from novel views. To account for this problem, the systems and methods may penalize divergence between the SIREN frequencies and phase shifts and their average values. The approach, even though it produces smooth geometries, can significantly reduce the range of the generator, leading to blurred reconstructions. The systems and methods may involve solving:

$$\min_z \|R(c, G(z, \cdot)) - x^*\| + \lambda S_{3D}(G(z, \cdot)), \tag{2}$$

where $S_{3D}$ imposes a high penalty for latent vectors z that can create unnatural geometries. The systems and methods may achieve such a 3D regularization by creating a convex combination of distances to reference geometries.

Beyond reconstructing the three-dimensional structure of a scene using a single view x*, the systems and methods can extend the method to general inverse problems. For example, the method can be directly applied when there are missing pixels in the view (inpainting), a blurred observed view, or observations of the single view with random projections or Fourier projections arising in medical imaging and compressed sensing.

Consider the general setting where the unknown two-dimensional scene can be x* and the system can observe $$y = A[x^*] + noise, \tag{3}$$

where is the forward operator that performs the pixel removal, blurring or projections respectively. Direct latent optimization in this case can correspond to solving the optimization problem to explain the measurements $$\min_z \|A[R(c, G(z, \cdot))] - y\|. \tag{4}$$

The natural baseline can create three-dimensional obstructions and artifacts as in the case of single view inversion. The method can use the same three-dimensional regularization and can solve the optimization problem:

$$\min_z \|A[R(c, G(z, \cdot))] - y\| + \lambda S_{3D}(G(z, \cdot)). \tag{5}$$

The method can be applied to linear inverse problems (where A is a matrix) or even non-linear problems like phase retrieval as long as the forward operator can be differentiable almost everywhere.

The key issue can be to devise a three-dimensional regularizer, $S_{3D}$, that does not lead to measurements overfitting (i.e., small measurements error (first term of (5)) but big real error $\|R(c, G(z, \cdot) - x\|)$. The systems and methods can use a set of reference geometries and an annealing mechanism in gradient descent to lock-in on better fitting geometries.

One limitation on reconstructing three-dimensional geometries and novel views from a single reference image can include that existing algorithms may not be sufficient, because either: i) they overfit to the measurements and produce artifacts to novel views, or ii) they significantly limit the expressive power of the generator.

The problem can be traced back to unrealistic three-dimensional geometries that need to be avoided in the course of the optimization. The systems and methods can include a principled framework for regularizing the radiance field itself, without sacrificing the range of the generator. The framework can drive the network to generate realistic geometries by measuring distance from a set of realistic geometries under a novel three-dimensional loss.

The systems and methods can obtain a candidate set of realistic geometries using CLIP and a pre-trained NerfGAN. The systems and methods can be experimentally evaluated and can achieve visual improvements and performance boosts over the baselines in a wide range of tasks. The method can achieve 30-40% MSE reduction and 15-25% reduction in LPIPS loss compared to the previous state of the art.

Reconstructed images can be sufficiently different compared to the input images. The poor frontal view reconstruction can be attributed to the limited range of the pi-GAN generator. Using the exact same generator can be able to get much better reconstructions compared to pi-GAN as shown visually and by the MSE and Perceptual losses.

The pi-GAN reconstructions can look like smoothed versions of the reference images. The superficial smoothness can come from the regularization term that can be used in the pi-GAN model. Specifically, the systems and methods can penalize divergence between the SIREN frequencies and phase shifts and their average values. A novel view can be obtained with pi-GAN without this regularization. The face can be much closer to the given input. There can be a caveat: the novel view can show artifacts. Experiments can show an important trade-off (i.e., matching better the measurements but with poor generalization vs inferior reconstruction of the image but smoother novel views).

A natural question can be why the optimization trajectory finds such geometries that match almost perfectly the given two-dimensional image but can produce artifacts in novel views. The short answer can be that these unrealistic geometries are fairly common, even in pure image generation with Gaussian inputs. An experiment can be used to validate this.

The system can first collect latent vectors, sampled from the Gaussian distribution, and the system can form the set $\mathcal{S} = \{z_1, \ldots, z_M\}$. For each of the elements in the set, the system can then render images from camera positions $c_1, \ldots, c_K$ and the system can form the set $\mathcal{S} = \{R(c_1, G(z, \cdot)), \ldots, R(c_K, G(z, \cdot))\}$. The system may assign a cost to each of these sets that can be given by the maximum difference of CLIP logits between the images in the set and the text prompt T="A non-corrupted image of a person." The cost $w_z$ of $\mathcal{S}$ can be given by:

$$w_z = \max_{s_1 s_2 \in S_z} |CLIP(s_1, T) - CLIP(s_1, T)|. \tag{6}$$

After assigning the costs, the set of latents that correspond to unrealistic geometries can be given by:

$$Bad_{z,\epsilon} = \{z \in S \mid w_z \geq \epsilon\}. \tag{7}$$

The fraction of unrealistic geometries, i.e.

$$\frac{|Bad_{z,\epsilon}|}{|S|},$$

can be a (noisy) measure of how often bad geometries occur in the range of a NerfGAN. Experiments can convey that unrealistic geometries can be quite common in the range of pi-GAN-approximately 40% of geometries can be classified as "bad" by CLIP. For a visualization of geometries that are classified as bad by CLIP, see the rightmost part of FIG. 3.

Similarly, one can use CLIP to identify realistic geometries. The systems and methods may include collecting a set of realistic geometries that render to visually plausible two-dimensional images. For each Gaussian sampled z, the system can assign two costs: i) the consistency cost that can be defined in (6) and ii) the plausibility cost:

$$c_z = \min_{s \in S_z} CLIP(s, T). \tag{8}$$

The system can then collect the set:

$$Bad_{z, \epsilon_1, \epsilon_2} = \{z \in S \mid w_z \geq \epsilon_1, c_z \geq \epsilon_2\}. \tag{9}$$

The whole procedure can be illustrated in FIG. 3, with examples of geometries and renderings of the "good" and "bad" set. The collected set of realistic geometries can be open sourced.

Without regularization, the optimization trajectory can often reach points of minimum loss but with poor generalization to novel views. Hence, the systems and methods may regularize towards realistic geometries. The systems and methods may use the notation $G_\sigma(z, \cdot)$ to denote the density part of the radiance field and $P \in \mathbb{R}^{k \times 3}$ to denote a set of points that corresponds to its voxelized representation.

One technique to constrain the three-dimensional shape can be to force it to be close to a three-dimensional geometry that is known to be good. The systems and methods may collect a set of latent vectors S that correspond to realistic geometries $\{G_\sigma(z, \cdot) | z \in S\}$ and can try to regularize the inferred geometry towards the most suitable geometry in our realistic set. This can be made more concrete in the form of the following optimization problem:

$$\min_{z \in \mathbb{R}^d} \frac{1}{2} \|R(c, G_\sigma(z, \cdot)) - x^*\|^2 \tag{10}$$

$$\text{s.t. } \min_{z_{ref} \in S} \mathcal{L}(G_\sigma(z, P), G_\sigma(z_{ref}, P)) \leq \epsilon.$$

The systems and methods can also work with the penalized version of the problem and can solve:

$$\min_{z \in \mathbb{R}^d, z_{ref} \in S} \frac{1}{2} \|R(c, G(z, \cdot)) - x^*\|^2 + \lambda \cdot \mathcal{L}(G_\sigma(z, P), G_\sigma(z_{ref}, P)). \tag{11}$$

There may be two issues with the formulation of (11). First, one issue can involve a min-min problem where the inner minimum can be over a discrete set. Gradient Descent (GD) can be likely to get stuck to a local minima: the reference geometry that happens to be closer to the initialization can be likely to be the active constraint of (10), even though it might not be the one that minimizes the total objective. The systems and methods can observe this problem experimentally. The second issue can be that the two terms in the loss function might be incompatible. For example, if the reference set $\mathcal{S}$ is small, there may be no geometry that renders to the measurements.

In some implementations, the systems and methods can include a relaxation of the objective of (11), where the min can be replaced with a soft-operator that allows all reference geometries to contribute to the gradients based on how close they are, under $\mathcal{L}$, to the current radiance field. The systems and methods can consider the following optimization problem:

$$\min_{z} \frac{1}{2} \|R(c, G(z, \cdot)) - x^*\|^2 + \lambda \sum_{z_{ref} \in S} \left( \frac{e^{-\tau \mathcal{L}_{z,z_{ref}}}}{\sum_{z'_{ref} \in S} e^{-\tau \mathcal{L}_{z,z_{ref'}}}} \right) \mathcal{L}_{z,z_{ref}}. \quad (12)$$

This can be interpreted as finding a nonnegative weighting of the losses $\mathcal{L}$ that solves $$\min_{w \geq 0} \sum_{i} w_i \mathcal{L}_{z,z_{ref}},$$

such mal $D(u, w) \leq \gamma$ for some divergence measure D, uniform distribution u, and a radius parameter $\gamma$. The softmax weighting can emerge when D is taken to be KL-divergence. Observe that for $\tau \to \infty$ (corresponding to a large enough $\gamma$), the optimization problems of Equations (11), (12) may have the same solution. However, this formulation can be more powerful since it can allow blending of the reference geometries in case the system cannot match the measurements otherwise. If the distribution of the contributions of each loss can be close to a Dirac and the combined loss can be small, then the systems and methods may include guaranteed three-dimensional consistency.

In the experiments, the systems and methods can use GD to solve the optimization problem of (12). The systems and methods can gradually anneal the temperature parameter t during the course of the optimization to encourage convergence to a single reference geometry. The systems and methods may choose the z that minimizes the total loss. If the loss curve is flattened, the systems and methods can prefer the z that corresponds to higher temperature, because it can signify better three-dimensional consistency.

To regularize for the stones, for each of the reference radiance fields, the systems and methods may obtain a face surface mask on the three-dimensional space and may constrain the reconstructed voxel grid to match the reference outside of this three-dimensional mask. The intuition can be that voxels outside of the facial surface should have low values (as in the reference geometries). Matching only these voxels can give the method enough flexibility to adjust the facial three-dimensional structure to match the measurements without having high density clusters (stones) outside of the face.

The systems and methods can let $M(p): \mathbb{R}^3 \to \{0, 1\}$ be the operator that gives the facial mask. The systems and methods can define the loss function as:

$$\mathcal{L}_{z,z_{ref}} = \|(G_\sigma(z, P) - G_\sigma(z_{ref}, P)) \odot (1 - M(P))\|_F \quad (13)$$

where $\|\cdot\|_F$ denotes the Frobenius norm.

In the experiments, the systems and methods can use the vertices of the generated polygons of the Marching Cubes algorithm to get the facial mask.

Example Experimentation

Figure 9:
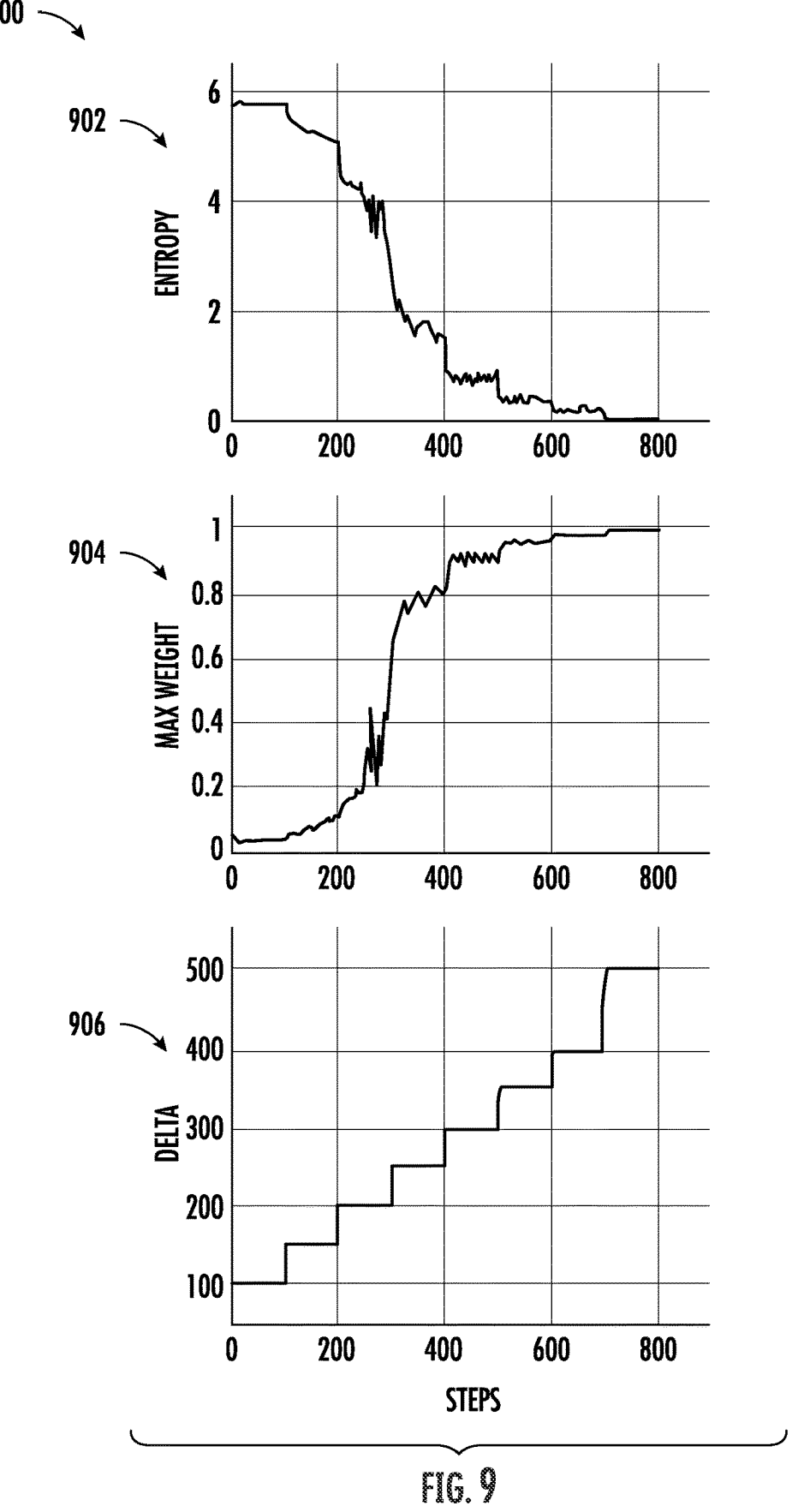
FIG. 9 depicts an illustration of example temperature annealing results according to example embodiments of the present disclosure.

FIG. 9 depicts an illustration of example temperature annealing results according to example embodiments of the present disclosure. In particular, FIG. 9 can depict example temperature annealing results. As the inverse temperature increases, the max weight and entropy of the distribution can progress in the direction of desire, showing that an example method of the systems and methods disclosed herein can "locks-in" good reference geometries as latent space optimization evolves. Changes in the entropy 902, max weight 904, and delta 906 can occur as the steps increase, and the changes are depicted in the three graphs of FIG. 9.

Figure 10:
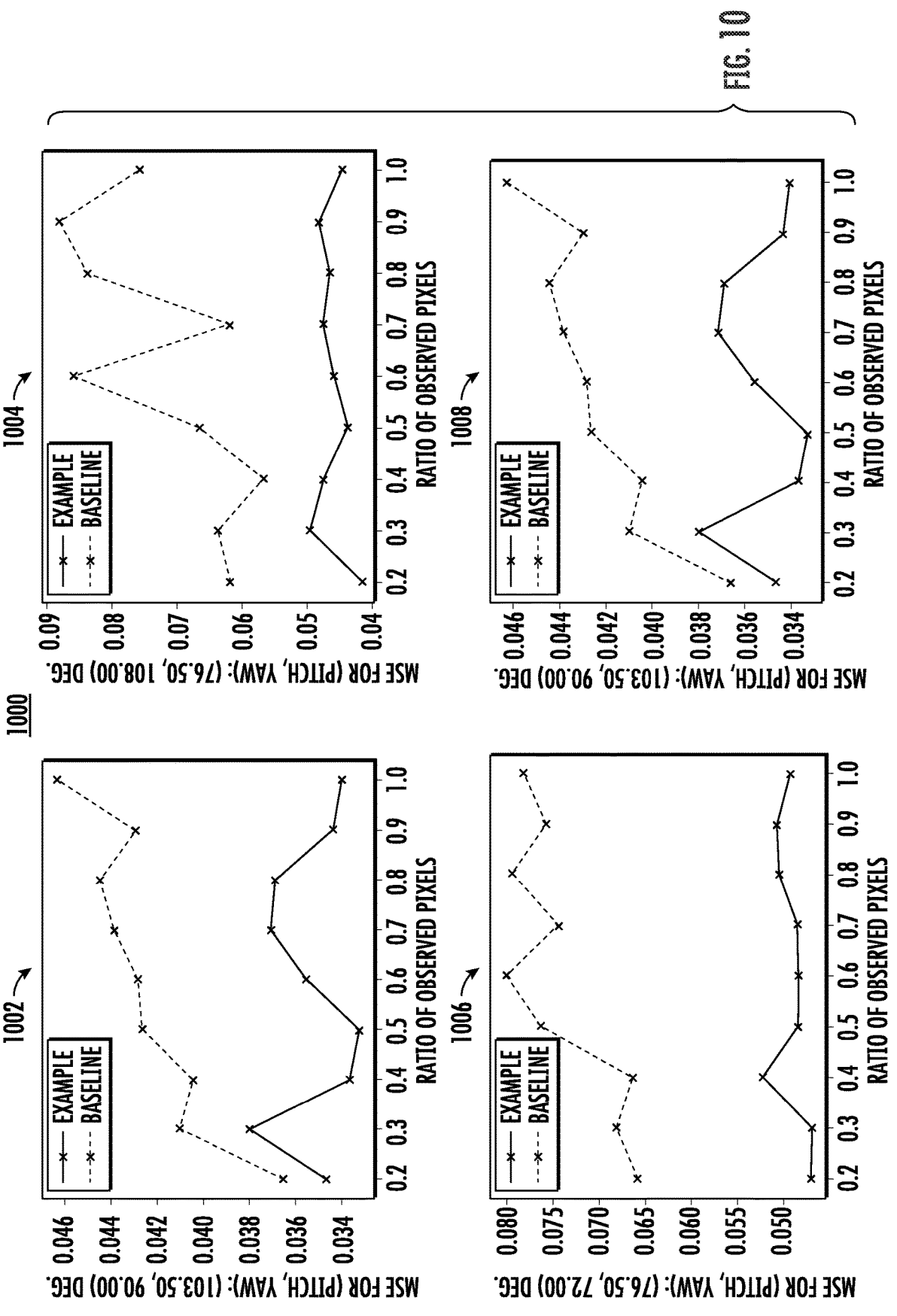
FIG. 10 depicts an illustration of example inpainting plot results according to example embodiments of the present disclosure.

FIG. 10 depicts an illustration of example inpainting plot results according to example embodiments of the present disclosure. In particular, FIG. 10 can depict illustrations of example inpainting plots 1000 for different views, as the number of measurements (observed pixels) of the frontal view change. As depicted, the example method can consistently outperform the baseline. As the number of observed pixels increases, the baseline method may overfit more and more to the measurements (frontal view) and can perform worse in novel views, indicating that the reconstructed geometry gets worse. The four example plots 1000 depicted include a first plot (with 103.50 pitch and 90.00 yaw) 1002, second plot (with 76.50 pitch and 180.00 yaw) 1004, a third plot (with 76.50 pitch and 72.00 yaw) 1006, and a fourth plot (with 103.50 pitch and 90.00 yaw) 1008.

FIG. 11 depicts an illustration of example model results according to example embodiments of the present disclosure. In particular, FIG. 11 can depict example comparisons 1100 between pi-GAN and an example implementation of the systems and methods disclosed herein on different camera angles on MSE and LPIPS metrics. MSE (top) 1102 can indicate two-dimensional pixel reconstruction, where the example method shows comparable loss in the given frontal view at (90,90), and noticeably lower loss in all other novel views. LPIPS (bottom) 1104 can describe the perceptual loss, suggesting that the example method has consistently less perceptual differences than pi-GAN.

In the experiments, the comparisons can use a pi-GAN generator, pre-trained on faces from CelebA.

The first comparison can be with the regularization proposed in the pi-GAN paper ($\ell_2$ penalty for divergence from the average frequencies and phase shifts). For a fair comparison, the experiment can use the reconstructions directly from known pi-GAN outcomes. The method can significantly outperform pi-GAN on the frontal view—the systems and methods can observe 42% reduction in MSE and 80% reduction in LPIPS for the first image. The pi-GAN method can indeed give novel views without artifacts, but since the distance to the ground truth can be very large.

The experiments can compare with the unregularized baseline that follows the CSGM approach to match the measurements (i.e., solves the problem defined in (1)). The experiment may run the method and the CSGM baseline on the images from a database and for some images in the range of NerfGAN. For the experiments, input can be the frontal view (one can run the method for any view, as long as the camera parameters are known).

For the images in the range, the experiment can have ground truth novel views. The method can produce less artifacts (e.g., the blurry blobs in a reconstructed image). In FIG. 11, the figure can show a quantitative comparison between the method and standard pi-GAN inversion for different views. In this experiment, the system can start with a generated three-dimensional neural radiance field such that the system can have ground truth for all views. As shown, the method can achieve 30-40% MSE reduction and 15-25% reduction in LPIPS loss compared to latent space optimization without the three-dimensional regularization.

The systems and methods may be motivated by the need to converge as much as possible to a single geometry. However, in the early stages of the optimization, the systems and methods may be allowed to reference geometries to contribute to the gradients since otherwise gradient descent might get trapped in a local minima. To achieve this, the systems and methods may be temperature annealing: in the early steps of gradient descent the system may have big temperature (i.e., the system may allow our distribution over the references to look like uniform) and as the system may progress the system may decrease the temperature (increase 8) to converge to a single radiance field. In the experiments, the systems and methods may not complete step annealing, increasing every 100 optimization steps the & by 50. FIG. 9 can show how 8, the entropy of the distribution over the references and its maximum weight can evolve over time. As shown, in the early stages, the distribution may have high entropy (close to uniform) and as time progresses the system can converge to a single radiance field, as may be desired.

In some implementations, the systems and methods can address the problem of inpainting where one does not observe a full view x* but rather a known subset of pixels is missing. The system may consider two different inpainting settings: random inpainting, where only a random subset of pixels may be observed and box inpainting where a part of an image may be missing.

In this case, the system may observe y=Ax*, where A can be a matrix created by selecting rows from the identity matrix, one for each observed pixel. In FIG. 10, the experiment can be plotted with the Mean Squared Error (MSE) versus the ratio of observed pixels for a novel view. The observations y=Ax* can be from the frontal view x* but with random sub-sampling. As shown, latent-space optimization baseline can have an increasing MSE as the number of observations increases. This can happen because the baseline may be overfitting and may fail to reconstruct the novel view correctly. In contrast, the method may be consistently producing lower MSE for the novel view.

At each optimization step, the method can generate a voxel grid using the current latent z. One natural question may be how coarse the voxel grid representation should be in order for the regularization to be effective. In some implementations, a voxel grid at resolution 32×32×32 can be utilized across the considered tasks. Hence, the number of additional queries to the NerfGAN can be the same as the ones that we need to generate an image at resolution 128×128 (which can be the standard resolution used in all our experiments). The method may run in approximately 3 mins per image on a workstation of 4 V100 GPUS.

The success of the method may be based in part on the quality of the collected set of voxel grids. If the set is not diverse or if it contains non-realistic three-dimensional structures, then the method may have decreased quality for some instances. Moreover, since all the geometries may be in the range of the GAN, any dataset biases may be reflected in the reconstructions. The method may only introduce biases in the three-dimensional structure of a face since the system may not be regularizing for color.

Another concern can be that the relaxation of the optimization problem can allow for solutions that may be blendings of the three-dimensional structures of the collected set. A blending of two realistic facial geometries may have artifacts. The systems and methods may account for this by annealing the temperature, effectively encouraging the optimization to converge to a single three-dimensional structure.

Additionally and/or alternatively, the systems and methods may regularize for a realistic three-dimensional struc-ture, but may not add any regularization on the colors. Non-smoothness in the three-dimensional color signal may give undesired transitions between nearby views. The systems and methods may not observe any such behavior with the pi-GAN generator, but it may happen with other models from the Nerf-GAN family.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining training data, wherein the training data comprises a training image, a respective position associated with the training image, and reference geometry data;
processing an input position with a machine-learned model to generate a view rendering and three-dimensional reconstruction data, wherein the input position is associated with an observation space associated with the respective position, wherein the view rendering comprises predicted image data descriptive of a scene, and wherein the three-dimensional reconstruction data is descriptive of predicted three-dimensional geometry;
evaluating a first loss function that evaluates a difference between the view rendering and the training image;
evaluating a second loss function that evaluates a difference between the three-dimensional reconstruction data and the reference geometry data; and
adjusting one or more parameters of the machine-learned model based at least in part on at least one of the first loss function or the second loss function.

2. The computing system of claim 1, wherein the first loss function comprises a two-dimensional reconstruction loss, wherein the two-dimensional reconstruction loss comprises a contrastive loss.

3. The computing system of claim 1, wherein the operations further comprise:

annealing a temperature parameter after adjusting the one or more parameters.

4. The computing system of claim 1, wherein the second loss function comprises a three-dimensional consistency loss.

5. The computing system of claim 1, wherein the training image comprises a frontal view of a face.

6. The computing system of claim 1, wherein the one or more parameters comprise one or more geometry parameters associated with a range of realistic geometries for an input image.

7. The computing system of claim 1, wherein adjusting the one or more parameters of the machine-learned model comprises training the machine-learned model to generate a color value prediction based at least in part on a range of geometric priors.

8. The computing system of claim 1, wherein adjusting the one or more parameters of the machine-learned model comprises training the machine-learned model to generate a density value prediction based at least in part on a range of geometric priors.

9. The computing system of claim 1, wherein the view rendering comprises data descriptive of a descriptive of a predicted density value and a predicted color value.

10. The computing system of claim 1, wherein the view rendering comprises a predicted color value determined at least in part on an integration of a color value distribution in a learned geometric range associated with a three-dimensional voxel grid.

11. The computing system of claim 1, wherein the machine-learned model comprises a mapping network model configured with feature-wise linear modulation conditioning.

12. The computing system of claim 1, wherein the view rendering comprises a two-dimensional reconstructed image associated with the respective position.

13. The computing system of claim 1, wherein the machine-learned model comprises a first model and a second model, wherein the first model comprises a surface prediction model, and wherein the second model comprises a renderer model.

14. The computing system of claim 1, wherein the input position is determined by sampling a point in the observation space.

15. A computer-implemented method, the method comprising:

obtaining, by a computing system comprising one or more processors, an input position and an input view direction;

processing, by the computing system, the input position and the input view direction with a surface prediction model to determine geometric range data, wherein the geometric range data is associated with a predicted range of geometric outcomes;

processing, by the computing system, the input position, the input view direction, and the geometric range data with a generative neural radiance field model to generate a view rendering, wherein the view rendering comprises a predicted color value and a predicted density value, wherein at least one of the predicted color value or the predicted density value are determined based on a learned neural radiance field and the geometric range data; and providing, by the computing system, the view rendering for display.

16. The method of claim 15, wherein the surface prediction model and the generative neural radiance field model were jointly trained with a training dataset comprising one or more training camera parameters and latent encoding data.

17. The method of claim 15, wherein the generative neural radiance field model was trained with a single frontal view image of a face, and wherein the view rendering comprises a novel view rendering of the face.

18. One or more non-transitory computer-readable media that collectively store instructions that, when executed by one or more computing devices, cause the one or more computing devices to perform operations, the operations comprising:

obtaining a plurality of sampled noise vectors and a plurality of camera parameters;

processing the plurality of sampled noise vectors with a neural radiance field model to generate a plurality of neural radiance field datasets;

processing the plurality of neural radiance field datasets and the plurality of camera parameters with a rendered model to generate a plurality of two-dimensional images; and determining one or more particular images of the plurality of two-dimensional images with a realistic geometry.

19. The one or more non-transitory computer-readable media of claim 18, wherein determining the one or more particular images of the plurality of two-dimensional images with the realistic geometry comprises:

processing the plurality of two-dimensional images with a geometry determination model to determine the one or more particular images, wherein the geometry determination model is configured to recognize one or more visual concepts.

20. The one or more non-transitory computer-readable media of claim 18, wherein the operations further comprise:

training at least one of a surface prediction model or a generative neural radiance field model with geometry data associated with the one or more particular images.

* * * * *